United States Patent
Attebury et al.

(10) Patent No.: US 7,729,937 B2
(45) Date of Patent: Jun. 1, 2010

(54) SYSTEM FOR DEVELOPING CUSTOM GROUP TOURS

(75) Inventors: Michael Taylor Attebury, Indianapolis, IN (US); Gregory Bernard Knotek, Brownsburg, IN (US)

(73) Assignee: Star Travel Services Inc., Bloomington, IN (US)

( * ) Notice: Subject to any disclaimer, the term of this patent is extended or adjusted under 35 U.S.C. 154(b) by 825 days.

(21) Appl. No.: 10/884,651

(22) Filed: Jul. 2, 2004

(65) Prior Publication Data

US 2005/0234750 A1 Oct. 20, 2005

Related U.S. Application Data

(63) Continuation-in-part of application No. 10/827,025, filed on Apr. 19, 2004.

(51) Int. Cl.
*G06Q 99/00* (2006.01)
(52) U.S. Cl. .................. 705/8; 705/7; 705/9; 707/9
(58) Field of Classification Search .............. 705/5, 705/6, 8, 9, 1, 7; 707/9
See application file for complete search history.

(56) References Cited

U.S. PATENT DOCUMENTS

| | | | |
|---|---|---|---|
| 5,948,040 A | 9/1999 | DeLorme et al. | 701/201 |
| 6,018,715 A | 1/2000 | Lynch et al. | 705/5 |
| 6,317,594 B1 * | 11/2001 | Gossman et al. | 455/414.1 |
| 6,321,158 B1 * | 11/2001 | DeLorme et al. | 701/201 |
| 6,557,007 B1 | 4/2003 | Pekowski et al. | 707/104.1 |
| 6,711,548 B1 * | 3/2004 | Rosenblatt | 705/6 |
| 2002/0156731 A1 * | 10/2002 | Seki et al. | 705/40 |
| 2002/0165761 A1 * | 11/2002 | Watanabe et al. | 705/10 |
| 2004/0070602 A1 * | 4/2004 | Kobuya et al. | 345/738 |
| 2004/0073447 A1 * | 4/2004 | Stuart et al. | 705/1 |
| 2004/0138906 A1 * | 7/2004 | Fagan | 705/1 |
| 2005/0033616 A1 * | 2/2005 | Vavul et al. | 705/5 |
| 2005/0222886 A1 * | 10/2005 | Sridharan | 705/8 |

FOREIGN PATENT DOCUMENTS

JP 2000029908 A * 1/2000

OTHER PUBLICATIONS

Davies et al, "Using and Determining Location in a Context-Sensitive Tour Guide", IEEE Journal, vol. 34, Issue 8, col. 35-41.*

* cited by examiner

*Primary Examiner*—Akiba K Robinson Boyce
(74) *Attorney, Agent, or Firm*—Brinks Hofer Gilson & Lione

(57) ABSTRACT

A customized group tour development system includes a server configured to execute a customized tour application. The customized tour application includes a sales module configured to generate a tour proposal for a custom tour as a function of a customized tour framework. The customized tour application may also include a client module that is configured to be enabled to allow creation of a group list within the customized tour framework. The group list may include participants in the custom tour. An operations module is also included in the customized tour application. The operations module is configured to develop the customized tour framework into a fully detailed customized tour.

10 Claims, 18 Drawing Sheets

Add/Edit Trip

| Field | Value |
|---|---|
| Destination | WDW |
| Start Date | 1/1/2004 |
| End Date | 1/12/2004 |
| Planned Pax | 80 |
| Planned Free Pax | 10 |
| Planned Students | 60 |
| Planned Adults | 10 |
| Planned Children | 0 |
| Planned Escorts | 2 |
| Check Bags Per Pax | 20 |
| Trip Number (404) | 94949 |
| Status (406) | pending ▶ |
| Sold Price quad | 0 |
| Sold Price triple | 0 |
| Sold Price double | 0 |
| Sold Price single | 0 |

402 ← (upper group), 408 ← (Sold Price group)

| Field | Value |
|---|---|
| Planned quad | 60 |
| Planned triple | 10 |
| Planned double | 10 |
| Planned single | 2 |
| Comp Quad | 0 |
| Comp Triple | 0 |
| Comp Twin | 0 |
| Comp Single | 0 |
| Sales Person | twilson ▶ |
| Ops Person | twilson ▶ |
| QC Person | twilson ▶ |
| Client Contact | Smith, Joe ▶ |
| Group Name | High School B ▶ |
| Individual Pay | ☐ |
| Online Pay | ☐ |
| Commission | 27 % |

410 (Planned quad–single), 412 (Comp), 414 (Persons/Contact/Group), 416 (Pay checkboxes), 418 (Commission %)

400

Save  Cancel  Close

TOUR COSTING (600)

| GROUP | High School Band | DESTINATION | WDW |
|---|---|---|---|
| Trip Number | 94949 | TRAVEL DATES | 01/01/2004-01/12/2004 |
| Contact | Joe,Smith | Total Pax | 80 |
| School | Columbus North | Free Pax | 10 |
| Address | 222 W. Ohio | Paying Pax | 70 |
| City, State, Zip | Indianapolis, IN 46204 | Students | 60 |
| Ofc Phone | m | Adults | 10 |
| Fax | m | Children | 0 |
| Mobile Phone | | Escorts | 2 |
| Home Phone | | No.Checked Bags per Pax | 2 |
| E-mail | m@m.com | Sales/Ops | Wilson,Tricia/Wilson,Tricia |

ITINERARY (602)

| Day | Time | Description | Quad | Triple | Double | Single |
|---|---|---|---|---|---|---|
| Wed 12/15/2004 | | Travel | | | | |
| SUBTOTAL ITINERARY | | | $0.00 | $0.00 | $0.00 | $0.00 |

(604)

PRO RATES (606)

| Description | | Quad | Triple | Double | Single |
|---|---|---|---|---|---|
| | | $ | $ | $ | $ |
| SUBTOTAL PRORATES | | $0.00 | $0.00 | $0.00 | $0.00 |
| SUBTOTAL ESCORTS | | $0.00 | $0.00 | $0.00 | $0.00 |
| SUBTOTAL DRIVER ROOMS | | $0.00 | $0.00 | $0.00 | $0.00 |
| SUBTOTAL COMPS | | $0.00 | $0.00 | $0.00 | $0.00 |
| NET TOTAL | | $0.00 | $0.00 | $0.00 | $0.00 |
| COMMISSION | 27.00% | | | | |
| CALCULATED TRIP COST | | | | | |
| SALES PERSON'S SELLING PRICE | | | | | |

Fig. 6B

| CONDITIONS | | | | | | |
|---|---|---|---|---|---|---|

608

| CLIENT PAYMENTS | | Amount | Due Date |
|---|---|---|---|

610

SALES & EARNINGS ESTIMATES

612

| | Estimated Number of Pax | Sales | Earnings | | |
|---|---|---|---|---|---|
| Quad | 60 | $0.00 | $0.00 | | |
| Triple | 10 | $0.00 | $0.00 | | |
| Double | 10 | $0.00 | $0.00 | | |
| Single | 2 | $0.00 | $0.00 | | |
| Totals | 82 | $0.00 | $0.00 | Estimated Profit: 0.00% | |

614

ESCORTS

| Name | Wages | Mileage | Rooms | Cash out | |
|---|---|---|---|---|---|
| SUBTOTAL | $0.00 | $0.00 | $0.00 | $0.00 | Per Pax:$0.00 |

616

COMPS

| Name | Number | Cost | Total | |
|---|---|---|---|---|
| Quad | 0 | $0.00 | $0.00 | |
| Triple | 0 | $0.00 | $0.00 | |
| Twin | 0 | $0.00 | $0.00 | |
| Single | 0 | $0.00 | $0.00 | |
| SUBTOTAL | 0 | | $0.00 | Per Pax $0.00 |

618

CASH FLOW PROJECTION

| Due Date | Vendor | Amount | Total Out | Invoice Amount | Net |
|---|---|---|---|---|---|

Fig. 11

*(Form 1100 showing fields: First Name, Last Name, Type (Adult), Is Chaperone?, Is Staff?, Chaperone (None), Instrument, Instrument Size, Instrument Weight, Instrument Quantity, Instrument Serial #, Passport Number, Emergency Contact, Emergency Phone, Address, Address2, City, State, Zip Code, Phone, Fax, Mobile; with Save, Cancel, Close buttons. Labels: 1100, 1102, 1104, 1106, 1112, 1114, 1116, 1118.)*

US 7,729,937 B2

SYSTEM FOR DEVELOPING CUSTOM GROUP TOURS

RELATED APPLICATIONS

The present patent document is a continuation-in-part of application Ser. No. 10/827,025 filed Apr. 19, 2004.

BACKGROUND

1. Technical Field

The present invention relates to group tours and more particularly to a computerized system for planning, development and management of custom group tours.

2. Background Information

Custom tours that involve developing an itinerary for a group of individuals traveling to a destination are typically prepared by a travel agency or other similar organization. A custom itinerary may also be developed for meetings or other functions involving a group of individuals by a function planning organization. In general, developing an itinerary for a group involves establishing an agenda of events and/or travel locations, identifying the individuals that are going to participate in the function or tour and building a sequential time schedule. In addition, development of an itinerary may also include determining services and/or venues supporting travel, locations and/or events. Determination and tracking of the costs and expenses of the tour for the group as a whole and for each individual participant may also be part of the process.

Computerized travel and reservation information and planning systems are widely used to assist in the development of itineraries for customized group tours. Typically, a tour organizer, such as a travel agency, collects information in the form of one or more lists of participating individuals that include personal information such as names, contact information, etc. The collected information may be provided as computer data or may be manually entered into a computer by the tour organizer. Based on the number of participants, the tour organizer may then use a computerized reservation system to reserve services such as airlines, buses and hotels that will be utilized by the group during the tour. The tour organizer may then assign each participating individual to an airplane seat, a bus seat, a hotel room, or other reserved accommodation. This is a manual process that involves associating the reserved accommodations information with the data related to each participating individual. Information related to other activities such as dining services, attractions, such as amusement parks, museums, etc., may also be identified and reserved by the tour organizer based on the list of participants.

Once the services and/or facility reservations are completed, the tour organizer will typically develop a tour booklet or other document for distribution to the group of participants. The tour booklet may include a daily schedule, maps, contact information for services and attractions being utilized and other details related to the tour. Compilation of the details associated with the tour related information is also a manual process requiring association of the services and venues related information with the group data and reservation data. In addition, the financial aspects of the tour, such as expenses, profit margins, etc. must be determined, compiled into financial data and tracked by the tour organizer. This involves a separate accounting computer system into which the financial data must be entered, verified and maintained.

Inherently, the participating individuals in such group tours are added and/or removed during the planning process. In addition, services, venues, time schedules, etc. change. Further, there may be errors and/or omissions in the data provided by the tour participants and/or the tour specific information that must be changed/corrected. Such changes must be reflected in the head count, the reserved accommodations, the financials, etc. Thus, the participant lists, reserved accommodations, the tour booklet and the financials must be frequently updated to accurately reflect the revised participants and/or tour itinerary. Typically, such changes are communicated verbally, by facsimile, etc. and must be made manually by the tour operator. In addition to the significant time and resources expended by the tour operator and/or the participants to communicate and effect such changes, the accuracy of the tour information may be compromised due to errors and inaccuracies introduced during the revision process. Not only may the quality of the tour experienced by the participants be affected by such errors but also the financial accuracy of the tour may be compromised.

Accordingly, there is a need for a system capable of developing, planning and managing customized group tours that minimizes opportunities for errors in the tour information and finances. In addition, a system is needed that minimizes manual data entry and data transfers between various systems used to develop such a customized group tour.

BRIEF SUMMARY

The present invention relates to a system for creation of a custom tour for a group. The system is a customized group tour development system that provides for the development, planning and management of customized tour groups. The customized group tour development system is a computerized solution that includes a server capable of communication over a network and a database in communication with the server. The system allows efficient and accurate development of a custom tour by maintaining and updating only one body of custom tour related information as the custom tour is developed. In addition, financial aspects, logistical aspects, etc. of the tour may be maintained, tracked and continuously updated by the customized group tour development system to maintain quality control.

The server is configured to execute instructions in a customized tour application that includes a security module, a sales module, a supplier module, a client module, a finance module and an operations module. The security module is configured to provide authentication of users and provide a corresponding predetermined level of access to the functionality and data included in the customized tour application. The users of the customized tour application may be categorized as one or more client users and one or more staff users. The client user is involved in the purchase of and/or participation in a custom tour. The staff user is part of the organization that develops, plans and manages the custom tour, and may include sales staff, operations staff, finance staff and management staff. The client staff and the sales staff may have a different login, a different authentication and a different network interface to the server.

The sales module is configured to provide access and functionality related to client contact information, and to generate a tour proposal for a custom tour based on a customized tour framework. The customized tour framework may be created with the sales module by a sales staff user, and stored in the database along with the tour proposal. The customized tour framework may also be configured to include one or more vendors, such as a lodging vendor, supplying accommodations, such as rooms, during the custom tour. The vendors may be selected with the supplier module.

The client module is configured to allow creation of a group list by a client user within the customized tour framework. The group list may be a group of individuals who will be participants in the custom tour. The client module may be enabled by the finance module to be accessed by the client user after approval of the tour proposal. The tour proposal may be reviewed and approved with the finance module by the finance staff. The group list may be used by the client module to generate an assignment list. The assignment list may be used by the client user to assign each of the participants to one of the accommodations. Upon assignment of a participant to an accommodation, the participant is removed from the assignment list and associated with the accommodation within the custom tour.

The operations staff may use the operations module to develop the customized tour framework into a fully detailed customized tour that includes the group list and the accommodation assignments. The fully detailed customized tour may be stored in the database. The finance module may be used by the finance staff to track and manage all financial aspects of the custom tour from the proposal stage to completion of the fully detailed custom tour. As information within the custom tour is changed and/or added, the finance module may reflect such changes in the financial aspects of the custom tour. When the fully detailed custom tour is developed, the operations staff may utilize the operations module to generate custom tour specific documents for use during the custom tour by the tour participants and a tour escort accompanying the tour.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 4 is customized frame work creation screen that is generated with the customized group tour development system illustrated in FIG. 1.

FIG. 6A is a first part of the tour costing sheet generated with the customized group tour development system illustrated in FIG. 1.

FIG. 6B is a second part of the tour costing sheet generated with the customized group tour development system illustrated in FIG. 1.

FIG. 11 is a new traveler information entry screen that is generated with the customized group tour development system illustrated in FIG. 1.

DETAILED DESCRIPTION OF THE DRAWINGS AND THE PRESENTLY PREFERRED EMBODIMENTS

The present invention includes a system for planning development and management of customized group tours. The system includes an interactive network based computerized arrangement that allows tour organizers and tour participants to cooperatively develop and plan a custom group tour. An example of tour participants may be a high school marching band desiring to participate in a trip to another state for a band competition and other various activities. The tour organizer may utilize the system to develop a customized tour framework and a resulting tour proposal for a custom group tour. The customized tour framework may include identification of at least one service provider (or vendor) that provides reserveable accommodations, such as an airline, a bus or a hotel.

Upon acceptance of the proposal by the tour participants, the tour participants may be provided access to the system. Using the system, the tour participants may enter a list of the group of tour participants to populate the customized tour framework. In addition, personal information of each tour participant may be entered into the customized tour framework. Using the group list, the tour participant may assign each of the tour participants in the group to one of the accommodations provided by the service provider(s) identified in the customized tour framework. The customized tour framework may also be further developed into a fully detailed customized tour to generate financial information, a daily schedule, tour specific information and tour books.

Figure 1:
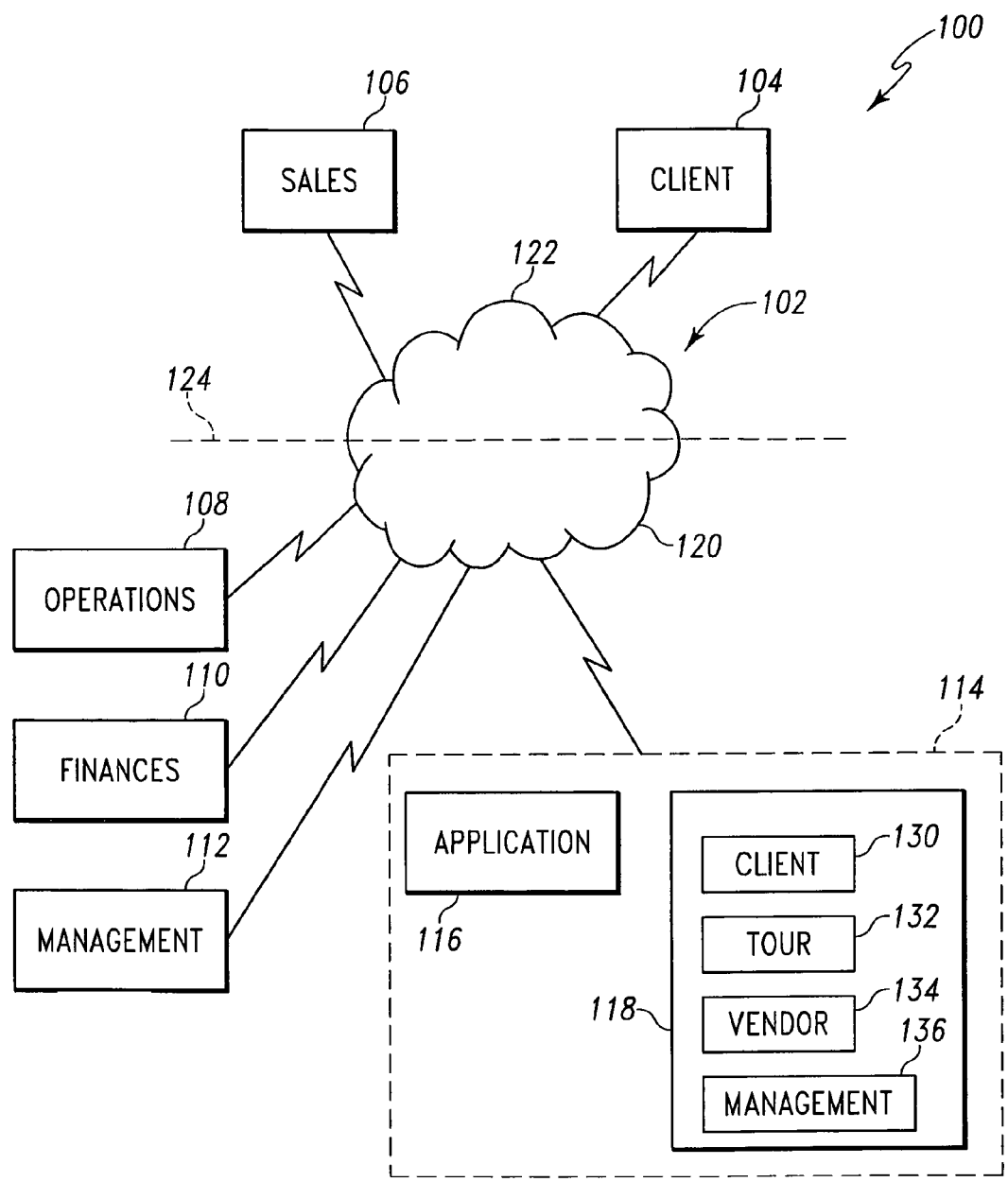
FIG. 1 is a block diagram of customized group tour development system.

FIG. 1 illustrates an example of a customized group tour development system 100 operating over a network 102. The customized group tour development system 100 includes a plurality of interface devices illustrated as a first interface device that is a client device 104. The client device 104 may be used by clients authorized to access the customized group tour development system 100. In addition, the customized group tour development system 100 may have a number of staff member interfaces for workers who sell, develop and provide customized tours to the clients. As used herein, the term "customized tour" refers to a sequence of previously planned and scheduled experiences for a group of participants that have elected to participate. A customized tour may include travel, overnight lodging, meetings, dining and/or activities/events.

In the illustrated example, the staff member interface includes a second interface device that is a sales device 106, a third interface device that is an operations device 108, a fourth interface device that is a finances device 110 and a fifth interface device that is a management device 112. In other examples fewer or additional interface devices may be included in the customized group tour development system 100.

The customized group tour development system 100 may also include at least one server 114 in communication with at least one database 118. The interface devices 104, 106, 108, 110 and 112 and the server 114 are coupled with the network 102. As used herein, the term "coupled", "connected" or "interconnected" may mean directly and/or indirectly capable of signal communication by wired and/or wireless communications and may include any mechanism(s) or device(s) providing a communication path to the network 102 as well as to other devices and/or components.

The network 102 may include the Internet, a public or private intranet, an extranet, and/or any other form of network configuration to enable transfer of data and commands. In the illustrated example, the network 102 includes a local network 120, such as a local area network (LAN) and the Internet 122. The local network 120 and the Internet 122 may be separated by a firewall 124 or any other device or mechanism capable of securely maintaining the local network 120 as inaccessible from the Internet without proper authorization.

As referred to herein, the network 102 should be broadly construed to include any software application(s) and hardware device(s) used to provide interconnected communication between devices and applications. For example, the interconnection between the local network 120 and the Internet 122 may involve connection with an Internet service provider (ISP) obtained using, for example, modems, cable modems, ISDN connections and devices, DSL connections and devices, fiber optic connections and devices, satellite connections and devices, wireless connections and devices, Bluetooth connections and devices, or any other communication interface device. Similarly, the local network 120 may include interconnections via software applications and various computing devices (network cards, cables, hubs, routers, etc.) that are used to interconnect various computing devices and/or provide a communication path.

Communication within the network 102 may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data.

An exemplary communication protocol is the Transport Control Protocol/Internet Protocol ("TCP/IP") network protocol suite, however, other Internet Protocol based networks, proprietary protocols, or any other form of network protocols are possible. Communications may also include, for example, IP tunneling protocols such as those that allow virtual private networks coupling multiple intranets or extranets together via the Internet. The network 102 may also support application protocols, such as, for example, telnet, POP3,Mime, HTTP, HTTPS, PPP, SMTP, proprietary protocols, or any other network protocols.

The interface devices 104, 106, 108, 110 and 112 may be any type of computing device or similar hardware capable of providing a connection for communication over the network 102. In addition, the interface devices 104, 106, 108, 110 and 112 may include a user interface (UI), memory, a microprocessor and/or any other hardware and associated operating systems/applications. For example, the interface devices 104, 106, 108, 110 and 112 may be wireless devices, such as, a wireless phone, a personal digital assistant (PDA), a pocket personal computer (PC) or any other device capable of wireless communication. In addition, the interface devices 104, 106, 108, 110 and 112 may be wireline devices, such as, for example, a network terminal, a personal computer, a server computer or any other device capable of wireline communication over the network 102. In other examples, the interface devices 104, 106, 108, 110 and 112 may include both wireline and wireless communication capabilities.

The interface devices 104, 106, 108, 110 and 112 may also include a browser. The browser may be any form of application running on the interface devices 104, 106, 108, 110 and 112 that is capable of locating and displaying pages downloaded from other devices in the network 102. For example, the browsers may be web browsers, such as, Microsoft™ Internet Explorer™ and/or Netscape Navigator™. In other examples, the browsers may be any other form of homogeneous or heterogeneous browsers with the functionality to locate and display pages downloaded over the network 102. In addition to displaying text and graphics within the pages, the interface devices 104, 106, 108, 110 and 112 may also support the presentation of video, audio, multimedia and/or any other information. Operation of the customized group tour development system 100 may also supported by the browsers. The browsers may be launched and operated on the interface devices 104, 106, 108, 110 and 112 to cooperatively operate with the server 114. In other examples, any other application may be used to communicate between the interface devices 104, 106, 108, 110 and 112 and the server 114 over the network 102.

The server 114 may be any form of computing device, such as, for example, at least one computer, capable of receiving requests and transmitting responses over the network 102. In the illustrated example, the server 114 may operate within the infrastructure of the customized group tour development system 100 to monitor requests from, and transmit responses to, the interface devices 104, 106, 108, 110 and 112. In one example, the server 114 is a hypertext transfer protocol (HTTP) server. In this example, the interface devices 104, 106, 108, 110 and 112 may use HTTP and/or secure HTTP (HTTPS) for communication with the server 114. In other examples, other protocols, such as, remote message interface (RMI), common object request broker architecture (CORBA), component object model (COM), public and/or private proprietary protocols or any other protocol may be used.

The server 114 may include at least one processor, at least one memory device, at least one user interface, at least one communication interface and/or any other functionality associated with operation, maintenance and control of a server computer. An operating system and applications executable by the server 114 to provide the functionality of a server computer, such as communication, etc. may be stored as instructions in the memory device. The memory device may be one or more information storage devices such as one or more magnetic storage devices, electronic storage devices and/or any other data storage devices allowing read/write access to data.

A customized tours application(s) 116 may also be stored as instructions in a memory device of the server 114. Alternatively, the customized tours application 116 may be stored in one or more memory devices that are accessible by the server 114. The customized tours application 116 may be executed by the server 114 to provide the functionality of the customized group tour development system 100. In addition, the customized tours application 116 may be capable of storage, maintenance and interface to one or more custom tours stored within the database 118.

The database 118 may also be maintained in a memory device in the server 114 and/or anywhere else in the network 102. Data within the database 118 may be stored in one centralized location or may be distributed among multiple locations within the network 102. The server 114 may execute the customized tours application 116 to cooperatively operate with the database 118.

The data within the database 118 may include client related information 130, tour related information 132, vendor related information 134 and management related information 136. As used herein, clients are groups or entities that may request and purchase a customized tour for a group of tour participants. As used herein, the term "tour participants" or "participants" refers to individuals who are members of a group that take part in activities planned as part of a custom tour. The client related information 130 may include contact data and customized tour data. The contact data may include information related to sales calls to each client and/or potential clients. The customized tour data may include information on groups of tour participants from previous custom tours, client specific tour requirements and any other client related information.

The tour related information 132 may include the specific data for each custom tour that is created. In addition, the tour related information 132 may include financial data, reports, etc. The vendor related information 134 may include vendor contact information, details on specific vendors, such as number of accommodations at a lodging vendor, number of tables in a restaurant, number of seats on a bus, etc. The management related information 134 may include user access control, statistical analysis, results reporting, financial results, etc.

Figure 2:
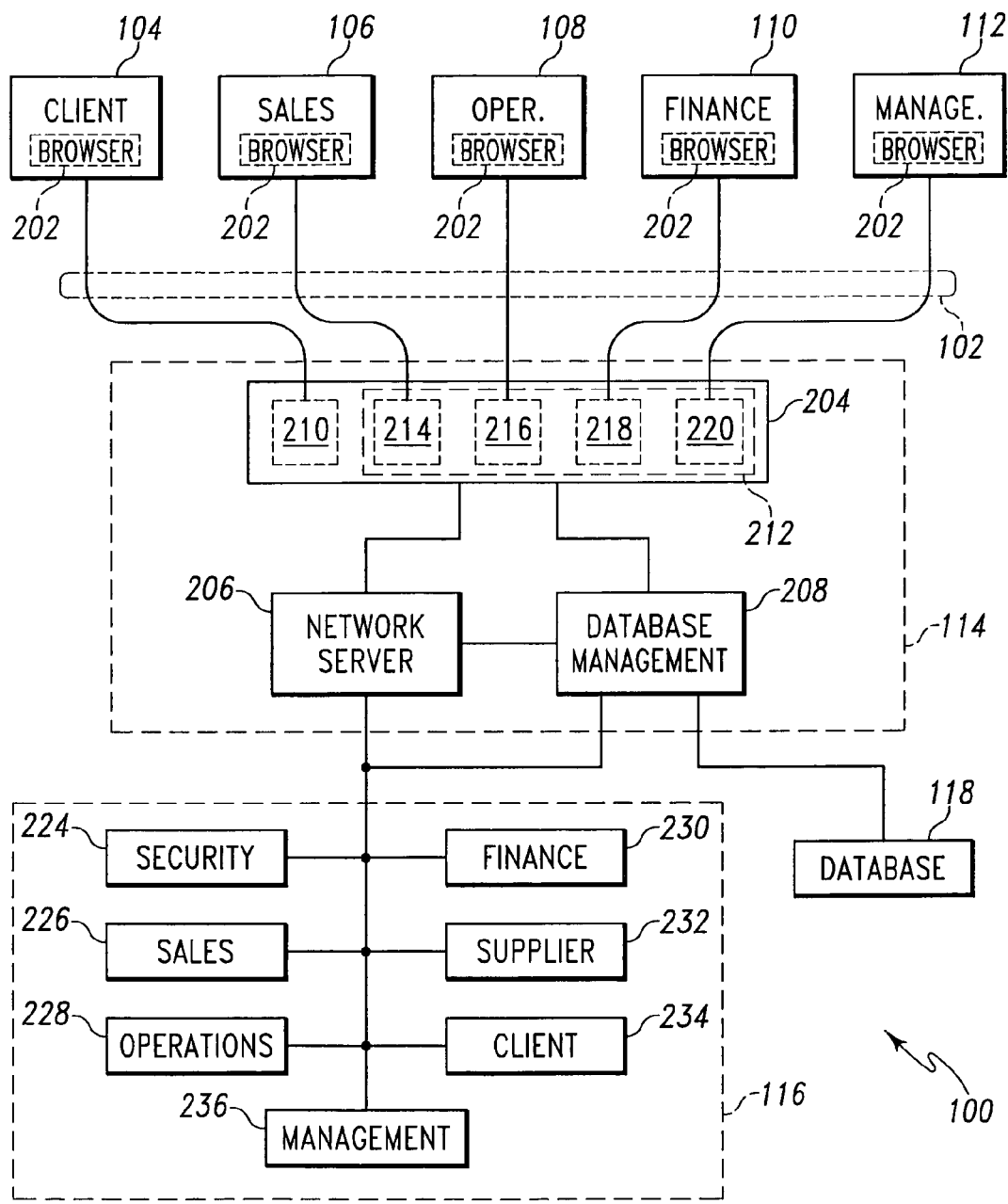
FIG. 2 is a more detailed block diagram of a portion of the customized group tour development system illustrated in FIG. 1.

FIG. 2 is a block diagram representing an example configuration of the interface devices 104, 106, 108, 110 and 112, the server 114, the customized tours application 116 and the database 118. The interface devices 104, 106, 108, 110 and 112 each include a browser 202. Each of the browsers 202 may communicate with the server 114 over the network 102. The illustrated configuration of the server 114 includes a network interface module 204, a network server module 206 and a database management engine 208.

The network interface module 204 may include a client interface module 210. In addition, the network interface module 204 may include at least one staff interface module 212. In the illustrated example, the staff interface module 212 includes a sales interface module 214, an operations interface module 216, a finance interface module 218 and a management module 220. In other examples, the network interface module 204 may include more or fewer network interfaces.

The network interface module 204 may provide access to the network server module 206 and the database management engine 208. The network interface module 204 may also provide a communication path to view, manipulate, add and delete data within the database 118. For example, the network interface module 204 may be implemented as an Internet, intranet or extranet accessible site using a browser such as, for example, Microsoft™ Internet Explorer. In other examples, other forms of interface may be implemented with the network interface module 204 such as, dial up access, intranet access, proprietary protocols, or any other form of interface that provides access to the network server module 206 and the database management engine 208.

Applications for secure communications with the interface devices 104, 106, 108, 110 and 112 may also be included in the network interface module 204. For example, secure data transmission over the network 102 may involve a secure socket layer (SSL) connection or encryption/decryption capability utilizing a unique private key and a unique public key. Establishment of secure communications may also include login passwords or some other form of identity confirmation to establish a level of secure access to the server 114 and the database 118.

Each of the interface devices 104, 106, 108, 110 and 112 may also utilize the network interface module 204 to generate respective graphical user interfaces to allow interaction by a respective user with the server 114, the customized tours application 116 and the database 118. The graphical user interfaces may include a plurality of pages such as active server pages (ASP) generated in a language such as HTML.

The network server module 206 may control the transmission of information and generation of displays for the browsers 202. In addition, the network server module 206 may receive data and/or selections entered into the browsers 202. The entry of data and/or selections into the browsers 202 may be performed with an input device such as a mouse, a keyboard, a touchscreen, a voice recognition system, or any other mechanism capable of making selections and/or entering data. Demonstration customized tours, help menus, reports, contact information and any other functionality of the customized tours application 116 involving the interface devices 104, 106, 108, 110 and 112 may also be directed with the network server module 206.

The database management engine 208 may be any application, such as a database management system (DBMS), capable of organizing and coordinating the storage and retrieval of data from the database 118. The database management engine 208 may cooperatively operate with the network server module 206 to transmit data between the server 114 and the interface devices 104, 106, 108, 110 and 112 as directed by the customized tours application 116. In addition, the database management engine 208 may be directed by the customized tours application 116 to provide security and access level information to the network interface module 204 and the network server module 206.

The illustrated configuration of the customized tour application 116 includes a security module 224, a sales module 226, an operations module 228, a financial module 230, a supplier module 232, a client module 234 and a management module 236. The functionality of each of the modules may selectively operate with the client information 130, the tour related information 132, the vendor information 134 and the management information 136 (FIG. 1) during operation of the customized group tour development system 100. In other examples, additional or fewer modules may be used to illustrate the functionality within the customized tour application 116.

The security module 224 utilizes identification information, such as passwords, biometrics (fingerprints, voice recognition, etc.) and/or any other mechanisms to identify individual users accessing the server 114 via the network 102. In addition, the security module 224 may maintain access levels associated with groups and or individual users. The access levels may allow different users access to various capabilities of the customized group tour development system 100 depending on the level of access granted. For example, a user gaining access via the client interface 104 may have only limited access to generate a group list within a custom tour and no access to the customized tour framework. Similarly, a user gaining access via the finance interface 110 may have complete capability to change and adjust the financial data, yet have no access to a group list. Further, a user gaining access via the sales interface may be provided the capability to change the customized tour framework, and yet have view only access to the financial data.

The sales module 226 provides sales related functionality for users authenticated by the security module 224 as being involved in the sale of customized tours. The sales module 226 may provide the functionality to create a custom tour framework for a group tour. As used herein, a "custom tour framework" or "customized tour framework" is an outline of the schedule and events encompassed in a custom tour. In addition, client information may be stored and managed with the sales module 226. Clients may be entities or groups such as a club, a high school, a business or any other organization that requests the planning and execution of a custom tour.

Reports in the form of trip specific documents such as proposals, letters of intent, etc. and also generic client related documents such as cover letters, health forms, etc. may be created, maintained and controlled with the functionality of the sales module 226. In addition, costing reports and proposals related to cost per individual, margins, etc. may be created, viewed, modified and printed with the functionality of the sales module 226.

The operations module 228 provides users with the capability to modify and expand existing customized tour frameworks created with the sales module 226 to produce a fully detailed customized tour. As used herein, a "fully detailed customized tour," or "fully detailed custom tour," is defined as a complete itinerary detailing the individual tour participants, the tour schedule and the tour events on a day-by-day and hour-by-hour basis. The tour events may include attractions, meals, lodging and/or transportation provided by service providers.

The security module 224 may allow users access to the operations module 228 via the operations interface 216 following verification that the user is authorized for such access. The operations module 228 provides staff users with the functionality to map a detailed itinerary for each aspect of the customized tour framework to develop the fully detailed customized tour. Development of the fully detailed customized tour may include creating an hourly itinerary for each day of the custom tour, finalizing activities and pricing based on the actual number of participants in the tour, etc. The operations module 228 may also provide the functionality to generate a custom tour specific tour booklet, escort booklet and any other tour related information.

The finance module 230 may provide users the capability to manage and oversee the financial aspects of each customized tour framework that has been created. The finance interface 218 provides users access to the finance module 230 following authentication of the user with the security module 224. The finance module 230 may also provide quality control functionality by allowing selective enablement and disablement of access to data and/or capability to modify data as the custom tour framework is developed into a fully detailed custom tour. As discussed later, the quality control may be performed with a status indicator. In addition, the finance module 230 may provide for generation and maintenance of a tour costing structure.

The tour costing structure may be based on the customized tour framework to provide a picture of the financial aspects of a particular customized tour. As additional information is provided in the customized tour framework to create the fully detailed customized tour, the tour costing structure may be simultaneously updated by the finance module 230 to allow continuous monitoring of financial aspects and the cash flow of the custom tour. In addition, billing and payment information can be generated and/or captured within the tour costing structure.

The supplier module 232 provides functionality for the management, selection, addition and deletion of vendors of goods and/or services that may be selectively included in the custom tour. Management and selection of vendors for trip items such as events, meals, lodging and transportation may be performed with the supplier module 232. Access to the supplier module 232 may be via either the sales interface 106, the operations interface 108 or the finance interface 110 depending on the authentication of the user by the security module 224. Vendor contact information, availability, pricing and/or available accommodations may also be accessed with the supplier module 232. As used herein, the term "accommodation" refers to reserveable services that may be assigned individually to the participants in the customized tour, such as, airplane seats, lodging rooms, bus seats, train seats, etc.

The client module 234 provides the capability to access, manage and edit select portions of the custom tour. Access to the client module 234 is typically provided to one or more of the participants in the custom tour. Following authentication, a client user may be provided access to the client module 234. Functionality available within the client module 234 includes the capability to create a group list. The group list includes data related to each of the participants in the custom tour, such as name, address, gender, contact information, etc. In addition, the client module 234 may allow the assignment of each of the participants identified in the group list to one of the accommodations identified in the customized tour framework, such as a hotel room. Participants assigned to an accommodation may be associated with the assigned accommodation by the client module 234.

The management module 236 provides the capability to change the security and levels of access of users accessing the customized group tour development system 100. In addition, the management module 236 may provide financial reports, performance reports, etc. Further, the management module 236 provides the capability to add and/or delete users to control access to the customized group tour development system 100.

In an example operational configuration, the server 114 is configured to provide two separate network accessible addresses to access the customized group tour development system 100 through a series of browser based active server pages (ASP). A first address that is a staff member address may provide browser based accessibility for the sales interface 106, the operations interface 108, the finance interface 110 and the management interface 112. A second address that is a client address may provide browser based accessibility for the client interface 104. In other examples, any number of separate network accessible addresses may be used to perform the functionality of the customized group tour development system 100.

Upon entry of either the staff member address or the client address, a user may be presented a login screen. Upon verification of the identity of the user with the security module 224, the user may be presented a home page of the customized group tour development system 100. Access to features and functionality within the home page and the customized group tour development system 100 may be preconfigured and controlled by the security module 224 based on the login information provided.

Figure 3:
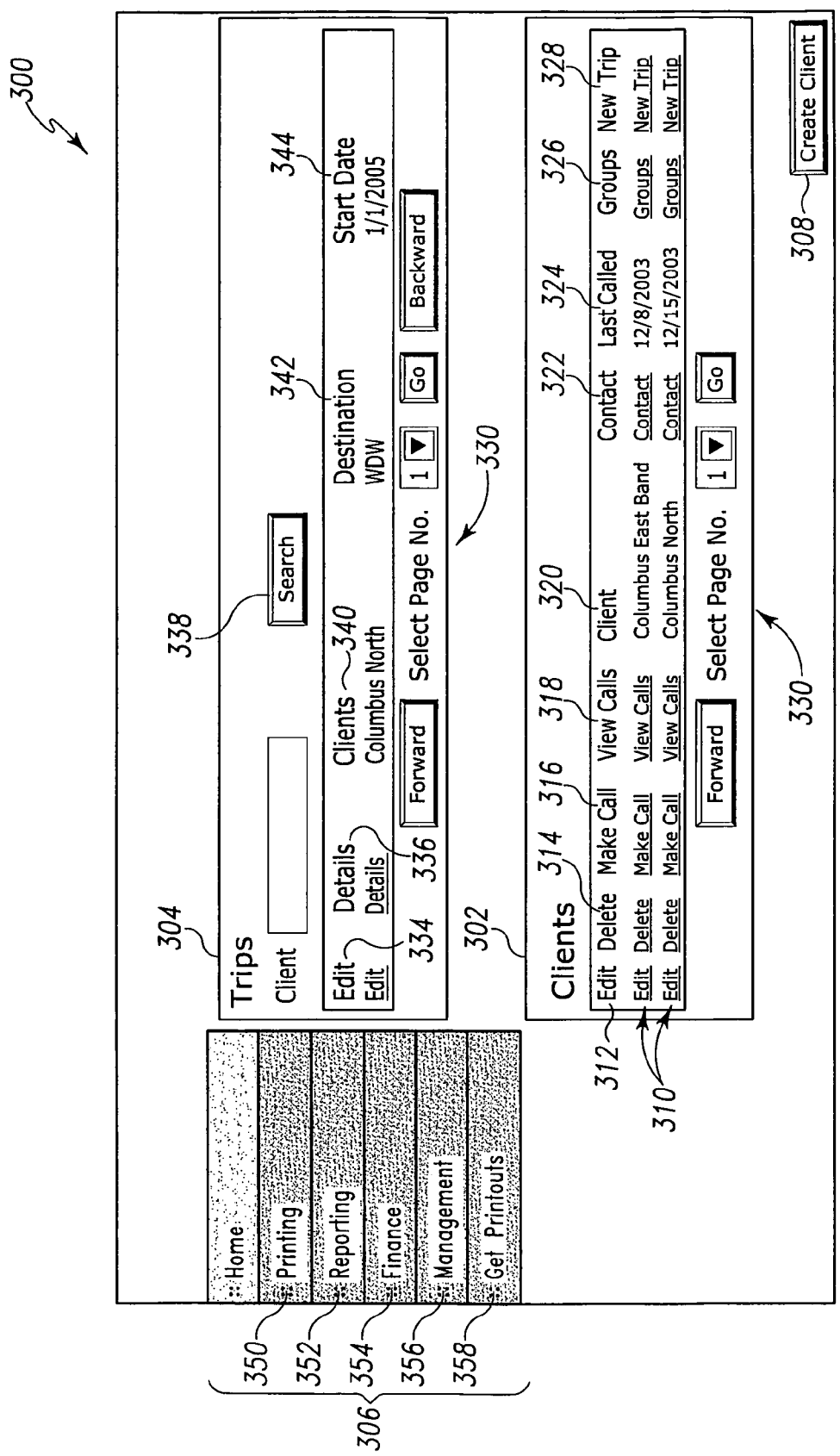
FIG. 3 is a staff home page generated with the customized group tour development system illustrated in FIG. 1.

FIG. 3 is an example staff home page 300 that is generated by the network server module 206 based on entry of the staff member address and successful authentication of the identity of a staff user. As used herein, "staff", "staff user" and "staff member" refers to users of the customized group tour development system 100 that are employed by the organization who sells, plans and orchestrates custom tours. The staff home page 300 may include a clients subscreen 302, a trips subscreen 304 and a navigation menu 306.

The clients subscreen 302 may be made available by the security module 224 (FIG. 2) to users on the sales staff. Functionality available from the clients subscreen 302 may be provided by the sales module 226 (FIG. 2). The example clients subscreen 302 includes a create client function 308. The create client function 308 may be used to create a client record 310 for each client by adding information to the client related information 130 in the database 118 (FIG. 1). Each of the client records 310 that are created in the client related information 130 may be displayed in the clients subscreen 302, and may include the capability to view, manipulate and actively maintain the information in the database 118.

Each of the illustrated example client records 310 includes a client edit function 312, a client delete function 314, a make call function 316, a view calls function 318, a client name field 320, a client contact function 322, a last called date field 324, a groups function 326 and a new trip function 328. In addition, the client subscreen 302 includes a page selection function 330 to select among multiple pages of client records 310. The client edit and delete functions 312 and 314 may be selected to edit client information and delete the client record 310, respectively. The make call function 316 may be selected to view all contacts within the selected client. The view calls function 318 may provide a log of previous sales calls that includes the individual contacted and the details of the contact. The client contact function 322 may be used to view, edit and/or add contacts within the selected client. The groups function 326 may be selected to add/edit the groups within the client that may desire a customized tour. The new trip functionality 328 may provide the capability initiate the creation of a customized tour framework.

FIG. 4 is an example of an add/edit trip screen 400 that allows entry of data to create a customized tour framework. As illustrated in FIG. 4, tour specific information 402, such as a destination, the start and end dates, the number of participants in the tour (PAX), number of students, number of adults, number of children, planned escorts and number of checked bags may be entered. In addition, a trip number 404 may be assigned, a status 406 selected and pricing information 408 may be entered.

The status 406 may provide indication of current status of the proposed customized tours by selection of a status description. In the example customized group tour development system 100, the status 406 may be pending, approved, sold, in process, cancelled, lost bid or closed. In other examples, additional or fewer status indicators may be included. The status 406 may be utilized to control use of the customized group tour development system 100 and/or access to data associated with a custom tour. In addition, the status of the custom tour may be used as a quality control function to enable different staff and/or client users access to a custom tour. Specifically, access to add, manipulate and/or delete data may be based on the status of the tour and the authorization of a user accessing the customized group tour development system 100.

The status may be changed with the finance module 230 by finance staff. Enablement and access rights for different users based on the status 406 may be administered by management staff using the management module 236. The security module 224 may control the access and enablement.

In the example customized group tour development system 100, when a customized tour framework is first generated by a member of the sales staff, the status may be indicated as a first status such as pending. Pending status may configure the security module 224 to allow access to the customized tour framework by only the sales staff user who proposed the trip to a client, selected finance staff users and management users.

Once a finance staff user has reviewed the customized tour framework and found no errors, the status 406 may be changed to a second status, such as approved. The status may be changed to approved by the finance staff user using the finance module 230. Once approved, functionality within the customized group tour development system 100 related to printing a tour proposal based on the customized tour framework may be enabled for use by the sales staff user to provide the tour proposal to the client as previously described.

Upon payment for the custom tour by the client (or execution of a letter of intent), the status 406 may be changed to a third status, such as sold. Once the status 406 becomes sold, the operations staff user may be enabled to also access and further develop the customized tour framework to create a fully detailed customized tour.

When the customized tour framework has been adequately developed by the operations staff user, the status 406 may be changed to a fourth status, such as in process. The in process status may enable access by client user(s) to add information related to the custom tour participants as described later. Following entry of data by the client user, the status 406 may be changed to a fifth status, such as closed. The closed status may deny the client user and the sales staff user further access to the custom tour. In addition, the closed status may enable the functionality to print reports and other trip related information, such as tour booklets as described later.

The pricing information 408 may include entry of a selling price for each trip option plan that is briefly described in corresponding planned tour entry windows 410. Comp information 412 may also be entered to indicate the number of complementary accommodations that are being provided as part of the custom tour. A complementary accommodation may be a room that one or more tour participants are not paying for. A contact information portion 414 may include contact information for the client and the sales staff member who has/is selling the custom tour.

A tour payment option 416 is also selectable as either payment by each individual participating in the tour or online payment. Payment by each individual enables individual invoicing of each participant in the tour. Accordingly, when the finance module 230 may be enabled to generate individual invoices for each participant based on entry of traveler information by the client as described later. Online payment indicates that the customized tour will be paid for as a group instead of individually. Thus, the finance module 230 may generate an invoice for the custom tour that is addressed to the representative of the group of participants. A commission entry 418 provides for the entry of a commission provided to the sales person identified in the contact information 414 for selling the custom tour. The data entered to create a custom tour may be stored in the tour related information 132 of the database 118. (FIG. 1)

Referring again to FIG. 3, the trips subscreen 304 may include a list of each of the custom tours in the database 118 that are accessible to a logged in user. For each of custom tours, the trips subscreen 304 includes a trip edit function 334, a trip details function 336, a search function 338 to search for a particular custom tour, and the page selection function 330. In addition, each of the custom tours may include a client name field 340, a destination field 342 and a start date field 344 where the name of the client, the destination and the start date of the custom tour respectively, may be displayed. The trip edit function 334 may provide the capability to edit the information included in the add/edit trip screen 400 illustrated in FIG. 4. The trip details function 336 may provide the capability to create the customized tour framework and to develop the customized tour framework into a fully detailed customized tour.

Figure 5:
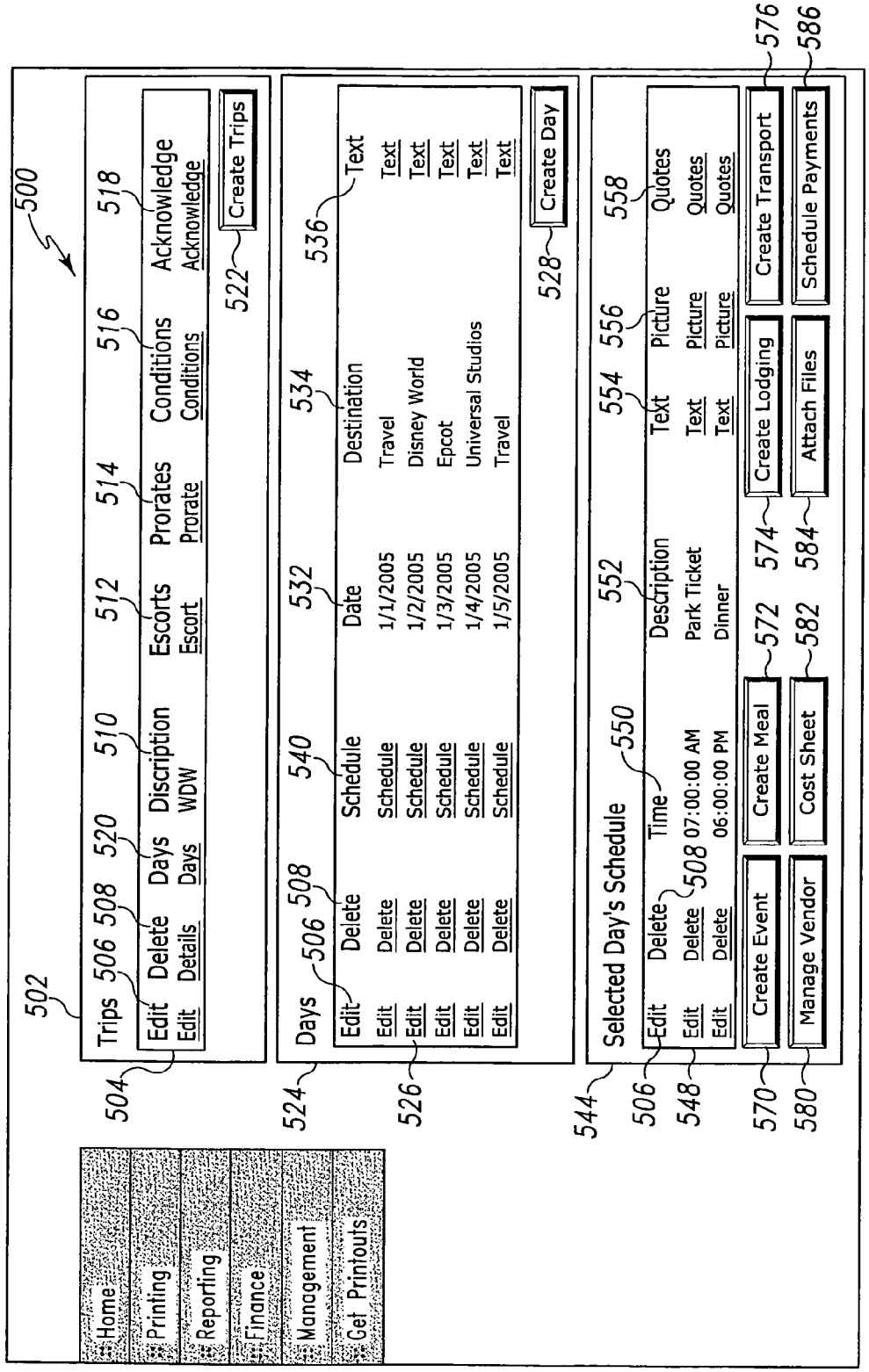
FIG. 5 is a tour details screen generated with the customized group tour development system illustrated in FIG. 1.

FIG. 5 is an example trip detail screen 500 accessible with the trip details function 336 (FIG. 3). The trip detail screen 500 may include a trip list subscreen 502. The trip list subscreen 502 may include one or more custom tour records 504. Each custom tour records 504 represents a custom tour and may include an edit function 506 and a delete function 508 to edit and delete a selected custom tour record 504 that is listed. In addition, the custom tour records 504 may each include a tour description field 510 describing the custom tour and an escort function 512 that provides for entry of escort information for individuals who escort the participants on the custom tour.

The escort information may include contact information for the escort, compensation for being an escort, and accommodations needed for the escort during the custom tour, such as type of lodging, etc. A prorates function 514 may also be included to provide the capability to prorate the cost of the custom tour such as, a flat rate or a per person rate. The custom tour records 504 may also include a conditions function 516 to allow the addition of contractual conditions to the custom tour and an acknowledge function 518 to provide the capability to recognize individuals within a client that are involved with the custom tour. Recognition of individuals within a client may be used to track sales, target marketing, etc. A create trips selection 522 is also included in the trip detail screen 500 to add custom tour records 504 to the trip list subscreen 502. Each of the custom tour records 504 also includes a days function 520.

When the days function 520 is selected, a days subscreen 524 may be presented in the trip detail screen 500. Within the days subscreen 524, one or more a day records 526 may be added to the custom tour with a create day selection 528. Once created, the day records 526 may be edited and deleted with the edit and delete functions 506 and 508. In addition, a date field 532 identifies the day, a destination field 534 generally identifies the days activity(s) and a text field function 536 allows entry of day specific instructions, descriptions, etc. Each of the day records 526 may also include a schedule functionality 540 that provides the capability to define a schedule and the activities within the selected day.

Upon selection of the schedule functionality 540, a selected days schedule subscreen 544 may be presented in the trip detail screen 500. As previously discussed, access to the days schedule subscreen 544 may be dependent on the status 406 (FIG. 4) of the custom tour. For example, if the status 406 of the custom tour is approved but not yet sold, the operations user staff will not have access. The selected days schedule subscreen 544 may include a sequential schedule of each of one or more of the days activities 548 that each include the edit and delete functionality 506 and 508. In addition, the selected days schedule subscreen 544 may include a time field 550 indicating the beginning of an activity 548, a description field 552 describing the activity 548, a text functionality 554 to enter miscellaneous descriptive text, a picture functionality 556 to associate an electronic representation of a picture with the selected activity 548 and a quote functionality 558 to develop a quote for the selected activity 548.

Also included in trip detail screen 500 is a plurality of create activity selections that includes a create event selection 570, a create meal selection 572, a create lodging selection 574 and a create transport selection 576. Following selection of one of the create activity selections, a corresponding activity pop-up window may be provided. Within the activity pop-up window, the supplier module 232 may be used to access the vendor related information 134 (FIG. 1) and select an appropriate vendor for the activity 548 being planned. In addition, pricing, start and end times, tax, tips and notes may be entered/imported into the activity pop-up window and stored in the database 118 (FIG. 1).

The trip detail screen 500 may also include a manage vendor selection 580 and a cost sheet selection 582. In addition, an attach files selection 584 to attach an electronic file to a custom tour and a schedule payments selection 586 to create a timetable for payment for the custom tour by the client may also be included in the trip detail screen 500. The payment schedule for the custom tour may include milestone payments, date based payments and/or any other form of payment plan. The manage vendor selection 580 may provide the capability to view, add and edit vendor related information using the supplier module 232. Vendor contact information, pricing, available services, such as number of rooms, seats, tables etc. may be viewed, edited and added to the database 118 (FIG. 1). The cost sheet selection 582 provides access to a tour costing sheet.

FIG. 6 is an example tour costing sheet 600. All financial related information built into the custom tour may be reflected by the finance module 230 (FIG. 2) in the tour costing sheet 600. During the proposal stage, the tour costing sheet 600 may provide the basis for a custom tour proposal based on creation of the customized tour framework. Following approval by the financial staff and acceptance of the proposal by the client, the tour costing sheet 600 may be continuously updated as the fully detailed customized tour is developed by the operations staff. Accordingly, the tour costing sheet 600 may be used to monitor and maintain margins, budgets and expenses beginning in the proposal process and continuing until the custom tour is fully developed. As previously discussed, the level of access to the various staff users may be dependent on the status 406.

The illustrated tour costing sheet 600 includes a custom tour identification section 602 that obtains details regarding the contact person for the group of individuals participating in the custom tour from the client related information 130 in the database 118 (FIG. 1). In addition, custom tour information from the trip details such as the example information illustrated in FIG. 4 may also be obtained from the tour related information 132 (FIG. 1), and included in the custom tour identification section 602.

The tour costing sheet 600 may also include an itinerary section 604. The itinerary section 604 may include a breakdown of the financial costs for each of the activities 548 identified in the itinerary developed with the trip detail screen 500 (FIG. 5). In addition, the itinerary section 604 may include variations in the proposal, such as different financial costs based on the number of participants sharing accommodations, such as rooms within a selected lodging vendor as illustrated.

A prorate section 606 may also be included in the tour costing sheet 600. The prorate section 606 may identify expected costs that are added to the total price of the custom tour, such as the prorates added with the prorates function 54 (FIG. 5). Prorates may be included based on the financial information provided in the trip detail screen 500 and may include expenses such as, the costs of escorts, drivers, advertising, printing, etc. In addition, a calculated cost of the custom tour and a total selling price of the custom tour may be developed by the finance module 230 (FIG. 2) and displayed in the prorate section 606.

A conditions section 608 may identify any client generated conditions of the custom tour, such as when the custom tour must be purchased by, etc. A client payments section 610 may detail a custom tour payment plan for the client. The custom tour payment plan may have been created with the schedule payments selection 586 (FIG. 5). Data included in the conditions section 608 and the client payments section 610 may be used in a tour proposal that will be discussed later.

The tour costing sheet 600 may also include a sales and earnings estimate section 612. Based on the number of participants (PAX) in the custom tour, a sales total and an earnings total may be generated to result in an estimated profit. An escort section 614 may provide detailed costing information related to any escorts accompanying all or a portion of the custom tour, as detailed in the custom tour records 504 (FIG. 5). In addition, a comps section 616 may be used to indicate costs of complimentary items, such as lodging, airfare, etc. for selected tour participants. Further, a cash flow projection section 618 may be populated with vendor invoice and payment data related to payment of vendors providing goods and/or services for the custom tour. The vendor payment data may be compared to the client payment data to maintain a positive cash flow for the custom tour.

Referring once again to FIG. 3, the navigation menu 306 may provide navigation to a plurality of selectable screens providing further functionality within the customized group tour development system 100. In the illustrated example, the navigation menu 306 includes the functionality to select the staff home screen 300, a printing screen selection 350, a reporting screen selection 352, a finance screen selection 354, a management screen selection 356 and a get printouts screen selection 358.

The selection of screens from the navigation menu 306 may be made available by the security module 224 based on the access level allocated to the authenticated user. For example, a sales staff user may only have access to the printing, reporting and get printouts screen selections 350, 352 and 358, while a user on the financial staff may have access to those selections and also the finance screen selection 354. A manager on the other hand, may have access to all the screen selections including the management screen selection 356. In other examples, additional or fewer screen selections may be included in the navigation menu 306 to provide the functionality herein described.

Figure 7:
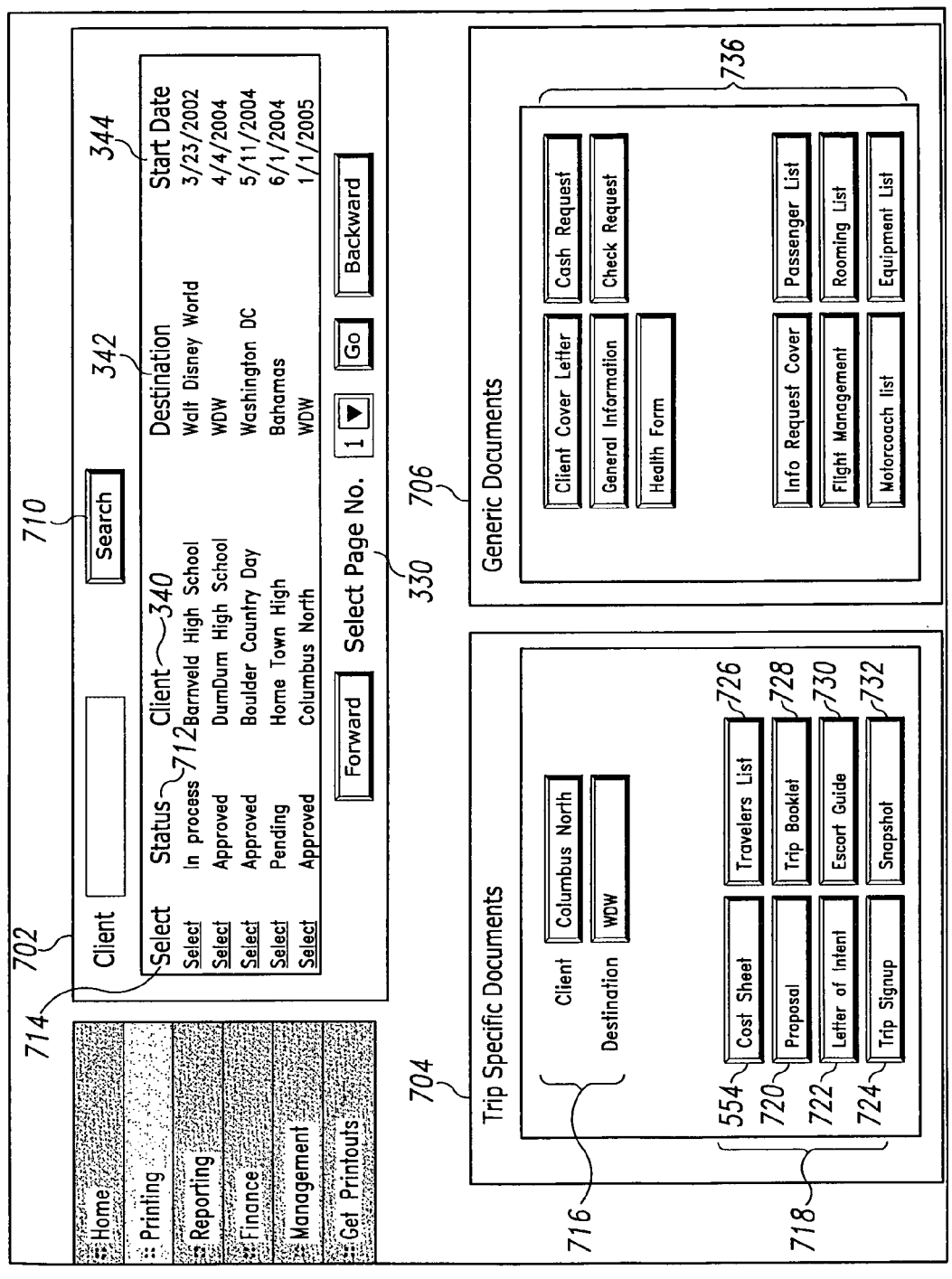
FIG. 7 is a printing screen generated with the customized group tour development system illustrated in FIG. 1.

FIG. 7 is an example of a printing screen 700 that is selectable with the printing screen selection 350 (FIG. 3). The printing screen 700 includes a client section 702, a trip specific documents section 704 and a generic documents section 706. The client section 702 includes a search selection 710 to search existing custom tour frameworks for a particular custom tour and the page selection function 330. A listing of custom tours currently in the database 118 (FIG. 1) may be generated in response to selection of the search selection 710. Each of custom tours listed may include a status window 712 to indicate whether the custom tour framework has been reviewed and approved.

Review and approval may be performed by, for example, a member of the financial staff. In the illustrated example, some of the custom tour frameworks have been approved, some are in process or being reviewed and some are still pending for review and approval. The custom tour frameworks may also include the client window 340, the destination window 342 and the start date 344 previously discussed with reference to FIG. 3. In addition, each of the custom tour frameworks includes a select function 714. The select function 714 allows a particular one of the custom tour frameworks to be selected by a user.

Once selected, the client name and destination are displayed in a custom tour identification windows 716 within the trip specific documents section 704. Documents associated with the particular custom tour are selectable for printing by a plurality of print selection buttons 718 included in the trip specific documents section. In the illustrated example, the cost sheet selection 582, a proposal selection 720, a letter of intent selection 722, a trip signup selection 724, a travelers list selection 726, a trip booklet selection 728, an escort guide selection 730 and a snapshot selection 732 are included. In other examples fewer or more print selections may be available based on the custom tour specific documents that are needed/desired.

The proposal selection 720 may initiate generation of a tour proposal that is capable of being printed. The tour proposal may include custom tour specific information such as cost information, itinerary information and activity information. In addition, the tour proposal may include non-custom tour specific proposal information such as contractual conditions, limitations, exclusions, cancellation and change policies, etc. The custom tour specific information may be automatically obtained from the database 118 (FIG. 1) by the sales module 226 (FIG. 2) and used to selectively populate the tour proposal. Following generation, the tour proposal may be printed and submitted to a potential client.

The letter of intent 722 may be a document provided by the client that is linked by the sales module 226 (FIG. 2) to the letter of intent selection 722. The trip signup selection 724 may initiate generation of a printable signup sheet for use by clients to obtain a list of participants. The traveler list selection 726 may be generated from a group list to include information on each participant in the custom tour. As discussed later, information in the group list may be entered by the client.

The trip booklet selection 728 may initiate the generation by the operations module 228 (FIG. 2) of a preformatted custom tour booklet for dissemination to the participants on the custom tour. The custom tour booklet may include custom tour specific information, such as an itinerary, custom tour conditions, day information, transportation information (flights, buses, trains, etc.), a group list, a rooming list, contact information, etc. The custom tour specific information may be obtained from the tour related information 132 in the database 118 (FIG. 1). In addition, the custom tour booklet may include non-custom tour specific information such as policies and procedures, suggested items to pack, emergency procedures, contact information, etc.

The escort guide selection 730 may initiate generation by the operations module 228 (FIG. 2) of an escort booklet that is similar to the custom tour booklet but includes more details related to custom tour organization. Additional custom tour specific information may include vendor contact information for the activities on the itinerary, participant medical conditions and other special needs, contingency plans, etc. The snapshot selection 731 may initiate generation by the operations module 228 (FIG. 2) of a summary style printable report of the itinerary for the custom tour. The information in the summary report may be obtained from the tour related information 132 in the database 118 (FIG. 1).

Enablement of the selection buttons 718 may be controlled with the security module 224. Accordingly, the capability to print the various reports may not be available until an event, or an approval has occurred. For example, the proposal selection 720 may only be enabled following review and approval of the custom tour framework by the finance staff. In another example, the trip signup selection 724 may not be available until a letter of intent is available. In still another example, the trip booklet, the escort guide and the snapshot selections 728, 730 and 732 may only be enabled after a travelers list is identified as complete. Accordingly, the enablement of the selection buttons 718 may provide a quality control function to ensure accuracy and proper procedures occur as a customized tour framework is proposed and then developed into a fully detailed customized tour.

The generic documents section 706 may also include a plurality of print selection buttons 736. Documents that are selectable for printing from the generic documents section 706 are non-custom tour specific documents.

Figure 8:
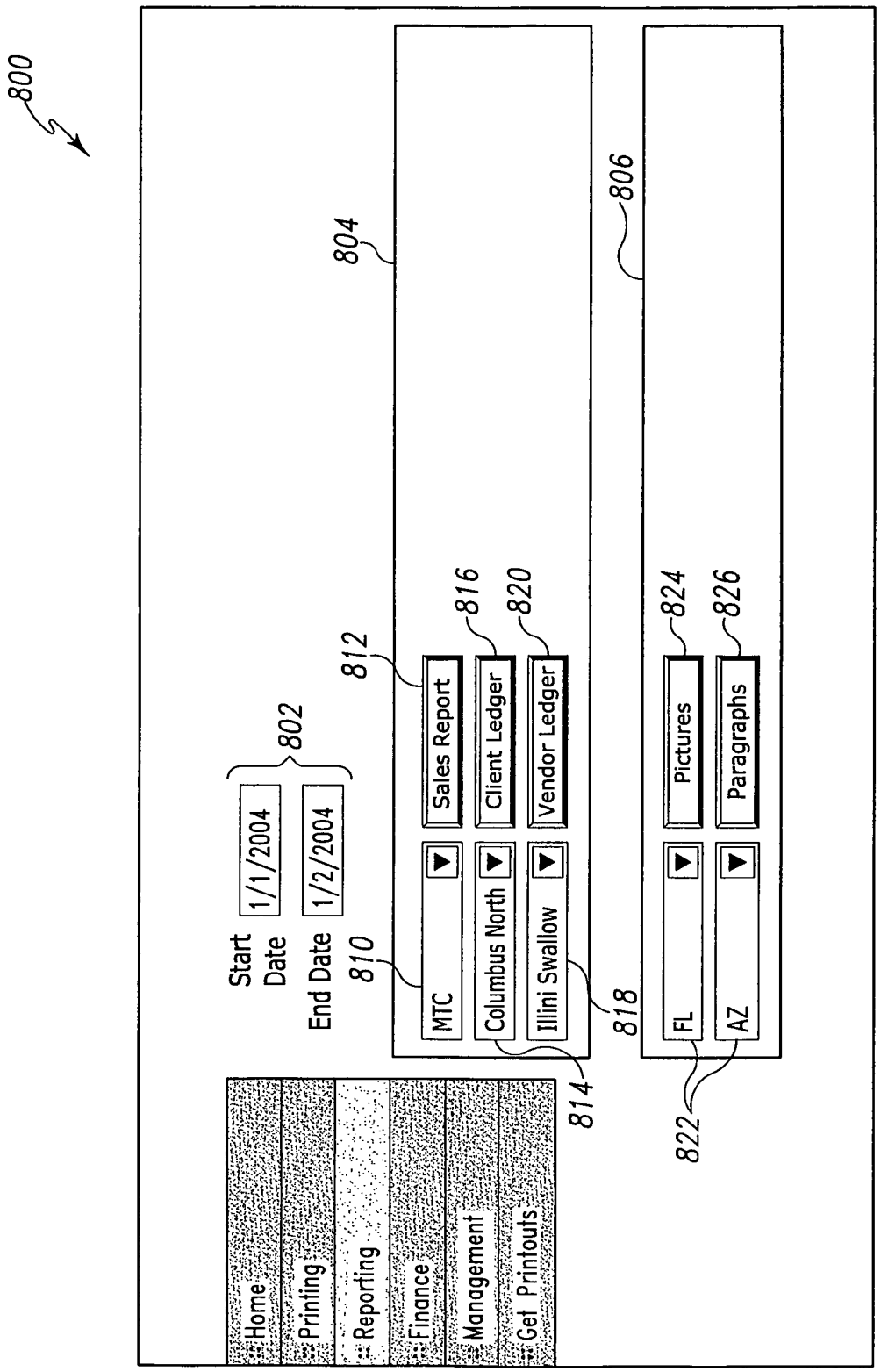
FIG. 8 is a reporting screen generated with the customized group tour development system illustrated in FIG. 1.

FIG. 8 is an example of a reporting screen 800 that is selectable with the reporting screen selection 352 in the navigation menu 306 (FIG. 3). The reporting screen 800 may include a report date section 802 where a start and end date may be entered, an accounting section 804 and a destination information section 806. In other examples, additional/different reporting may be included as desired.

The accounting section 804 may include a franchise selection menu 810 and an associated sales report button 812. The franchise selection menu 810 may be a pull down menu that provides for selection from among a plurality of franchises providing custom tours with the customized group tour development system 100. The sales report button 812 may initiate generation by the sales module 226 (FIG. 2) of a sales report for the selected franchise. The sales report selector 812 may provide a summary of each custom tour that includes custom specific tour information extracted from the database 118 (FIG. 1) by the sales module 226 (FIG. 2). The custom specific tour information may include, for example, identification of the tour, indication of earnings and profits, destination and departure date.

A client selection menu 814 may be a pull down menu that provides for selection from among clients with client information stored within the database 118 (FIG. 1). A client ledger button 816 may initiate selection of a client ledger report by the finance module 230 (FIG. 2) for the corresponding client selected with the client selection menu 814. The client ledger report may include indication of the custom tours for that particular client along with invoices, payments, costs and margins. The accounting section 804 may also include a vendor selection menu 818 and a vendor ledger button 820. The vendor selection menu 818 provides for selection of any vendor currently stored in the database 118 (FIG. 1). The vendor ledger button 820 initiates generation by the finance module 230 (FIG. 2) of a vendor ledger for the vendor selected in the vendor selection menu 818. The vendor ledger may include payments, invoices and a current balance for the selected vendor.

The destination information section 806 may be used to identify destination related photographs and information. The photographs and/or information may be stored in the database 118 (FIG. 1), or may be stored elsewhere and accessed by links from within the destination information section 806. In the illustrated example, a state selection menu 822 is available for each of a picture selection button 824 and a paragraphs selection button 826. The state selection menu 822 may be used to select a state of interest and the picture selection button may be selected to initiate generation by the operations module 228 (FIG. 2) of pictures or activities, attractions, features, etc. in the selected state.

Similarly, selection of the paragraphs selection button 826 may initiate generation by the operations and/or sales module 228 (FIG. 2) of one or more paragraphs of information describing activities, attractions, features, etc. of the selected state. The pictures and paragraphs may be selectively included in a proposal, a trip booklet an escort guide, or any other documents associated with a custom tour framework or a fully detailed custom tour. Selective enablement of the capability to initiate the previously discussed reports may be based on authentication of a user with the security module 224 (FIG. 2).

Figure 9:
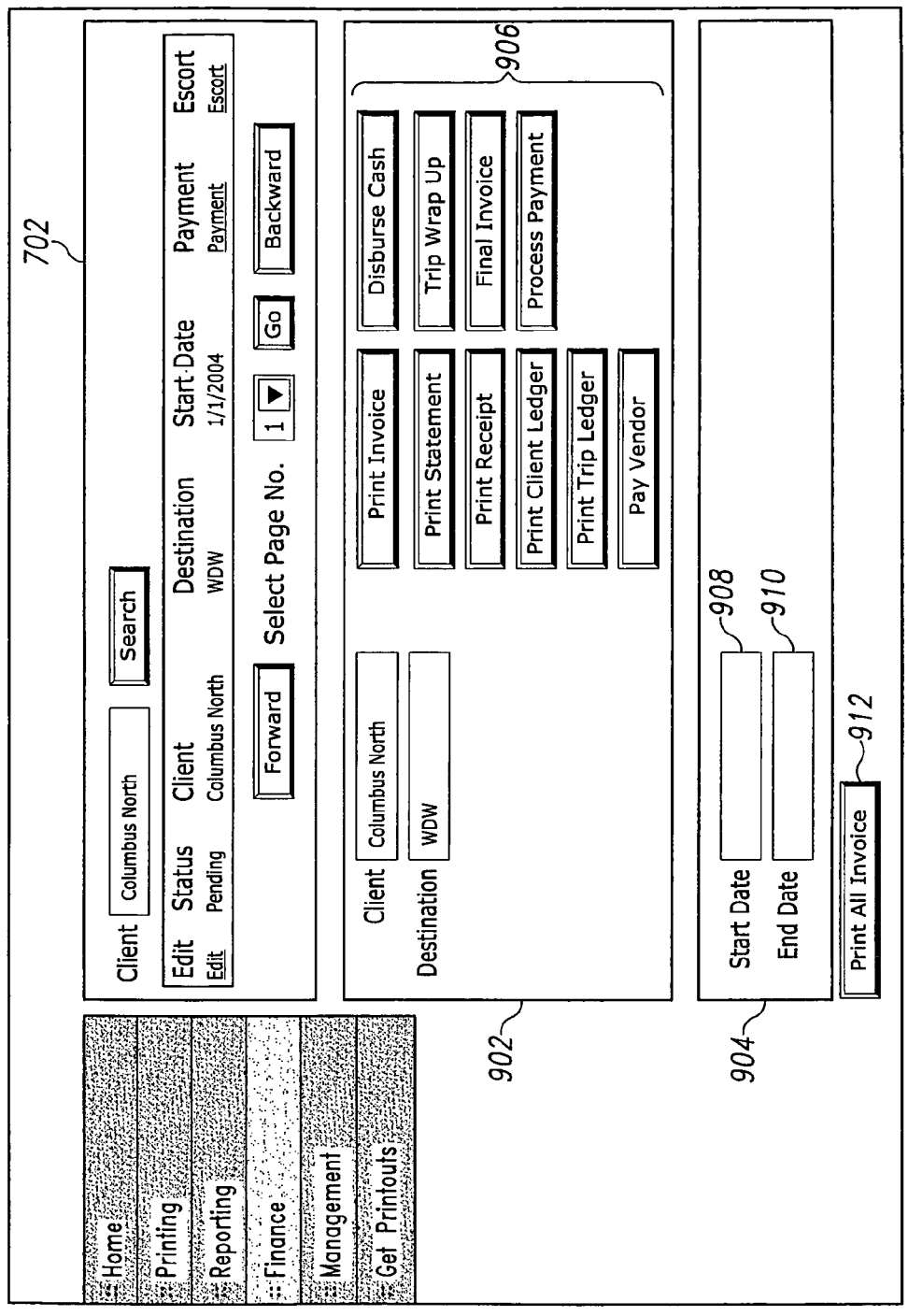
FIG. 9 is a finance screen generated with the customized group tour development system illustrated in FIG. 1.

FIG. 9 is an example finance screen 900 that may be initiated with the finance screen selection 354 (FIG. 3) via the network server module 206 (FIG. 2). Functionality of the finance screen 900 may be provided with the finance module 230 (FIG. 2). The illustrated finance screen 900 may include the client section 702 as previously discussed with reference to FIG. 7, a trip finance section 902 and an invoice print section 904. The client section 702 may allow the selection from a list of custom tours as previously discussed. The trip finance section 902 may include the custom tour identification windows 716 to display the selected client name and destination.

In addition, the trip finance section 902 may include a plurality of finance function selections 906. The finance function selections 906 may provide the capability to print various finance related documents, pay vendors, disburse cash, generate invoices, process payments and any other finance related functions. The invoice print section 904 includes a start date entry 908, an end date entry 910 and a print all invoices button 912. The start and end date entries 908 and 910 may be used to enter a start and end date for a desired range of invoices. The print all invoices button 912 may activate the finances module 234 (FIG. 2) to print all invoices in the database 118 (FIG. 1) falling within the previously entered start and end date entries 908 and 910.

The management screen selection 356 initiates generation by the management module 236 of a management screen with the network server module 206 (FIG. 2). As previously discussed, the management screen selection 356 (or any other screen selections) may be selectively enabled by the security module 224 (FIG. 2) based on authentication of a user assigned an appropriate access level.

The management screen may provide, via the management module 236 (FIG. 2), the capability to configure/grant access rights and authentication settings for any of the users of the customized group tour development system 100. In addition, statistical performance based reporting, such as sales call reporting, financial reporting, time management reporting or any other management related reporting may be obtained. Further, addition, editing, manipulation and control of the non-custom tour specific information stored in the database 118, such as the destination information screen 806 of FIG. 8, may be performed with the management screen and the management module 236 (FIG. 2).

Selection of the get printouts screen selection 358 initiates generation of a report list of archived reports that were previously generated from the reporting screen 800 discussed with reference to FIG. 8. The archived reports may be stored in the database 118 (FIG. 1) for later retrieval. Selection of a report entry from the report list initiates retrieval of the archived report described in the report entry and includes the data generated when the report was initially generated. Accordingly, data from a custom tour that is in the archived report may not match the data currently in the database (118) if changes to the data in the database (118) were made after the report was generated.

Figure 10:
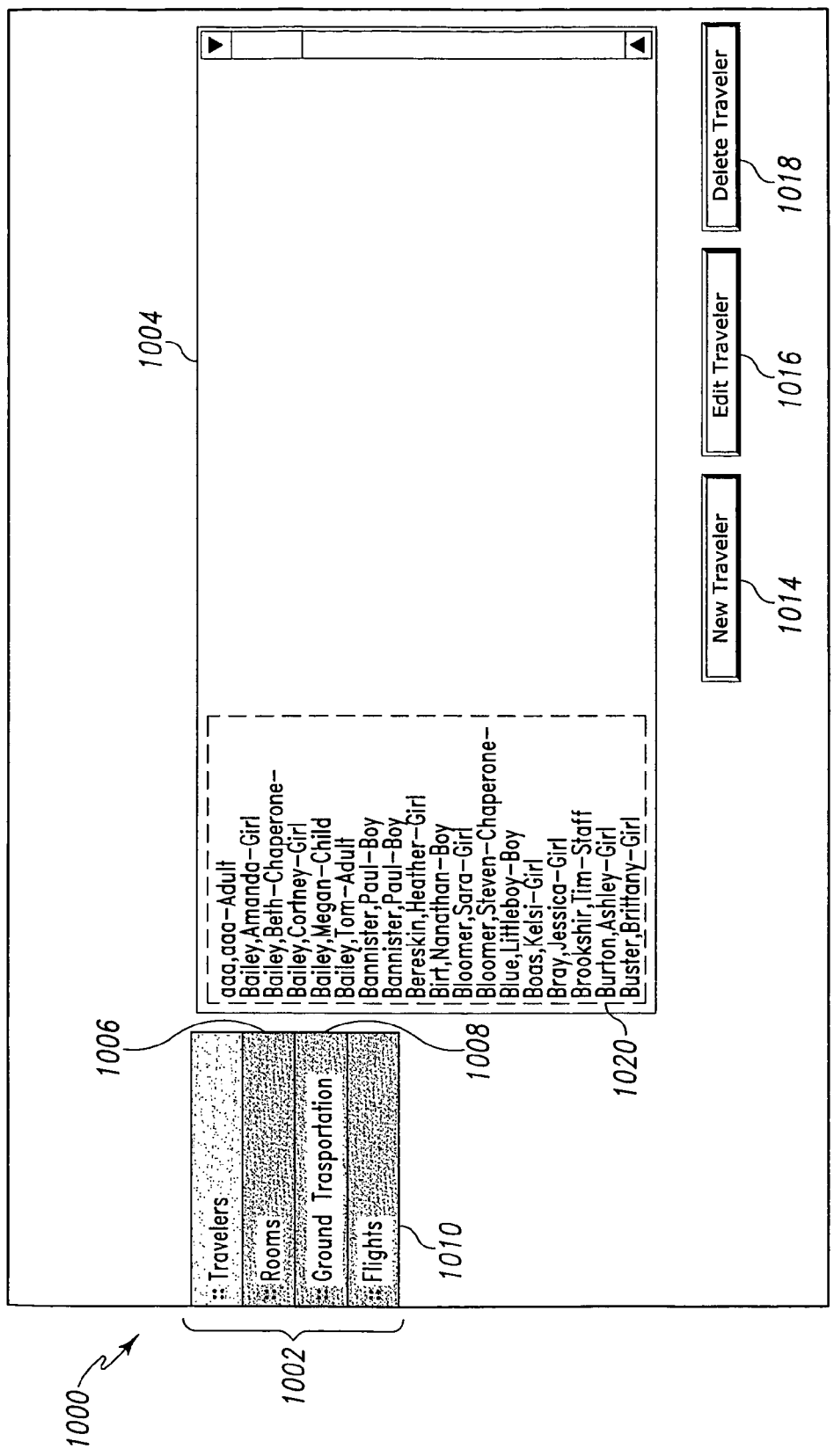
FIG. 10 is a client home page generated with the customized group tour development system illustrated in FIG. 1.

FIG. 10 is an example client home page 1000 that is generated by the network server 206 (FIG. 2) based on entry of the client address and successful authentication of the identity of a user. As used herein, "client" and "client user" refers to users of the customized group tour development system 100 that purchase a custom tour and may be participants in the custom tour. The client home page 1000 may include a client navigation menu 1002 and a group list 1004. Functionality of the client home page 1000 may be provided by the client module 234 (FIG. 2).

The information accessible from the client home page 1000 may be specific to a particular custom tour. The security module 224 may be configured to only allow access to information associated with a particular custom tour based on the login information (authentication information) supplied by the client user. The client navigation menu 1002 may provide navigation to a plurality of selectable screens providing further functionality via the client module 234 (FIG. 2) for clients within the customized group tour development system 100. In the illustrated example, the client navigation menu 1002 includes the functionality to select the client home page 1000, a rooms screen selection 1006, a ground transportation screen selection 1008 and a flights screen selection 1010. In other examples additional or fewer selections may be included in the client navigation menu 1002.

The group list 1004 may allow creation of a list of the participants in the custom tour using the client module 234 (FIG. 2). The group list 1004 may be created by a client user following acceptance by the client user of a proposal for a custom tour framework. The client user may be provided authentication information, such as a user name and password that allows access to the accepted custom tour framework.

The group list created by the client user may form part of the custom tour framework. Creation and updating of the group list 1004 may be performed using a new traveler button 1014, an edit traveler button 1016 and a delete traveler button 1018 that are also included in the travelers home page 1000. When initially accessed by a client user, the group list 1004 may be blank. Upon selection of the new traveler button 1014, the client user may be enabled to add a traveler record 1020. Each of the traveler records 1020 may allow identification information for a participant on the custom tour to be added.

FIG. 11 is an example new traveler screen 1100 that may be a pop-up screen initiated by the client module 234 (FIG. 2) when the new traveler button 1014 is selected. The new traveler screen 1100 includes contact information 1102, participant identification 1104 and participant's equipment 1106. The contact information 1102 may include name, address, phone numbers, passport numbers, emergency contact information, etc. The participant identification 1104 may include a type selection menu 1112 to categorize the participant as an adult, a boy, a girl, or a child. In other examples, any other types may be included to categorize participants. In addition, a chaperone checkbox 1114 and a staff checkbox 1116 may be used to further identify and categorize a participant.

A chaperone menu 1118 may also be selectively available in the new traveler screen 1100 to assign a chaperone to a participant. The chaperone menu 1118 may be enabled and disabled based on the selection in the type selection menu 1112. For example, when a boy or a girl is selected, the chaperone menu 1118 may be enabled to select a chaperone for association with that participant. Whereas, if adult is selected from the type selection menu 1112, the chaperone menu 1118 may be disabled and the chaperone and/or staff checkboxes 1114 and/or 1116 may be enabled.

The participant's equipment 1106 may allow entry of information related to the participant's baggage, sporting equipment, animals, or any other items the participant is bringing on the custom tour. In the illustrated example, the participant's information is for one or more musical instruments. Accordingly, the type of instrument, the size, the weight, the quantity and serial number may be entered. In other examples, detailed information about any other type of item may be entered. From the new traveler screen 1100, the information that is entered may be saved in the database 118 (FIG. 1) or cancelled. In addition, the new traveler screen 1100 may be closed.

Referring again to FIG. 10, the edit traveler button 1016 may be activated following selection of a travel record 1020 of one of the previously added participants from the group list 1004. Upon activation, the new traveler screen 1100 previously discussed with reference to FIG. 11 may be displayed. The client module 234 (FIG. 2) may make available for editing all the information previously entered/configured for the selected participant in the new traveler screen 1100. The delete traveler button 1018 may be activated following selection of one of the previously added participants to delete the selected participant from the group list using the client module 234 (FIG. 2).

Figure 12:
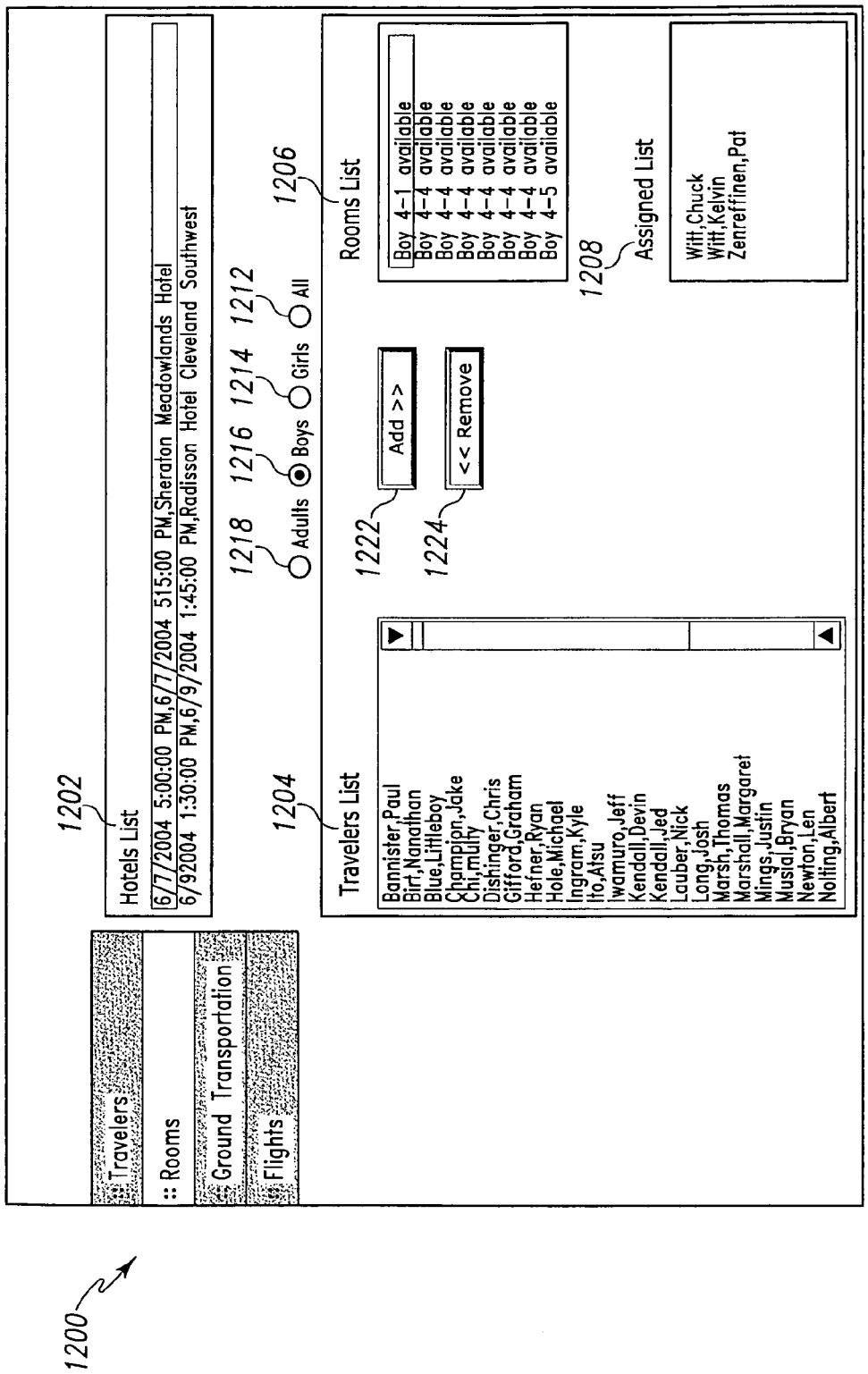
FIG. 12 is a lodging screen generated with the customized group tour development system illustrated in FIG. 1.

FIG. 12 is an example rooms selection screen 1200 that may be a pop-up screen initiated by activation of the rooms screen selection 1006 (FIG. 10). The rooms selection screen 1200 may include a lodging list 1202, an assignment list 1204, a lodging accommodations list 1206 and an accommodations assigned list 1208. A client user may assign participants of the custom tour to lodging accommodations using the client module 234 (FIG. 2) within the rooms selection screen 1200.

The lodging list 1202 may be a list of the lodging that has been selected to be part of the custom tour. As previously discussed, the lodging may be added to the customized tour framework using the create lodging button 574 discussed with reference to FIG. 5. When the rooms selection screen 1200 is generated by the network server 206 (FIG. 2), the lodging vendor information for the custom tour may be obtained by the supplier module 232 (FIG. 2) from the database 118 (FIG. 1) and displayed in the lodging list 1202. The lodging list 1202 may also include the date of stay, the arrival time and the name of the hotel or other lodging accommodation.

The assignment list 1204 may be generated by the client module 234 (FIG. 2) to include at least a portion of the participants previously entered by the client user in the group list 1004 (FIG. 10). In the illustrated example, the rooms selection screen 1200 includes an all selection 1212. Activation of the all selection 1212 may initiate generation of an assignment list 1204 that has all the participants from the group list 1004 (FIG. 10). Selection of the girls selection 1214, the boys selection 1216 or the adults selection 1218 may initiate generation of an assignment list 1204 that includes only those participants from the group list 1004 who were identified as a girl, a boy or an adult, respectively, with the type selection menu 1112 (FIG. 11).

The lodging accommodation list 1206 indicates the accommodations (rooms) that are available for assignment to each of the participants in the custom tour. Identification of the rooms that are available may be configured using the create lodging selection 574 (FIG. 5). In addition, the available rooms may be sub-divided into the type-groups based on the types of participants by designating a type for each available room. For example, rooms designated for boys may be on a separate floor or hallway than the rooms for girls, the rooms for adults may be next to the rooms for children, etc. In other examples, any other scheme may be used to sub-divide the rooms into categories.

The specific information such as the rooms that are available from the vendor, the relative locations of the rooms, the number of assignable spots in a room, etc. may be obtained from the database 118 (FIG. 1) using the supplier module 232 (FIG. 2). Alternatively, the lodging vendor may be contacted to obtain availability and the specific information for the rooms that are available. This information may be stored in the database 118 as part of the custom tour. The lodging accommodation list 1206 may indicate the type designated for the room, the number of participants that the room can accommodate and the available assignable spots remaining in the room based on the number of participants currently assigned to the room.

The accommodations assigned list 1208 may indicate the participants that are assigned to a particular room displayed in the lodging accommodation list 1206. When a client user selects a room in the lodging accommodation list 1206, the corresponding participants assigned to the selected room may be displayed in the accommodations assigned list 1208. By selecting one of the participants from either the lodging travelers list 1204 or the accommodations assigned list 1208, the client user may add/remove the selected participant using an add button 1222 and a remove button 1224.

As an individual participant is added to the accommodations assigned list 1208, the name of the participant is moved from the assignment list 1204 to the accommodations assigned list 1208 so that the participant is now associated with one of the accommodations. When a participant currently associated with an accommodation is selected and the remove button 1224 is activated, the selected participant is removed from the accommodations assigned list 1208 and returned to the assignment list 1204. As participants are added and removed from the rooms, the lodging accommodation list 1206 may be updated to reflect number of assignable spots available in the accommodation.

In the illustrated example, "boys" has been selected as the type using the boys selection 1216. Thus, the assignment list 1204 includes only those participants identified as boys with the type selection menu 1112 (FIG. 11). In addition, the lodging accommodation list 1206 may reflect those accommodations that have been designated as for boys. The example room selected in the lodging accommodations list 1206 is a room for boys with a total of four assignable spots with one assignable spot left available due to the participants that are currently assigned to the room as listed in the accommodations assigned list 1208. The three participants that are listed have been previously moved from the assignment list 1204. Thus, one more participant may be moved to fill the room.

Figure 13:
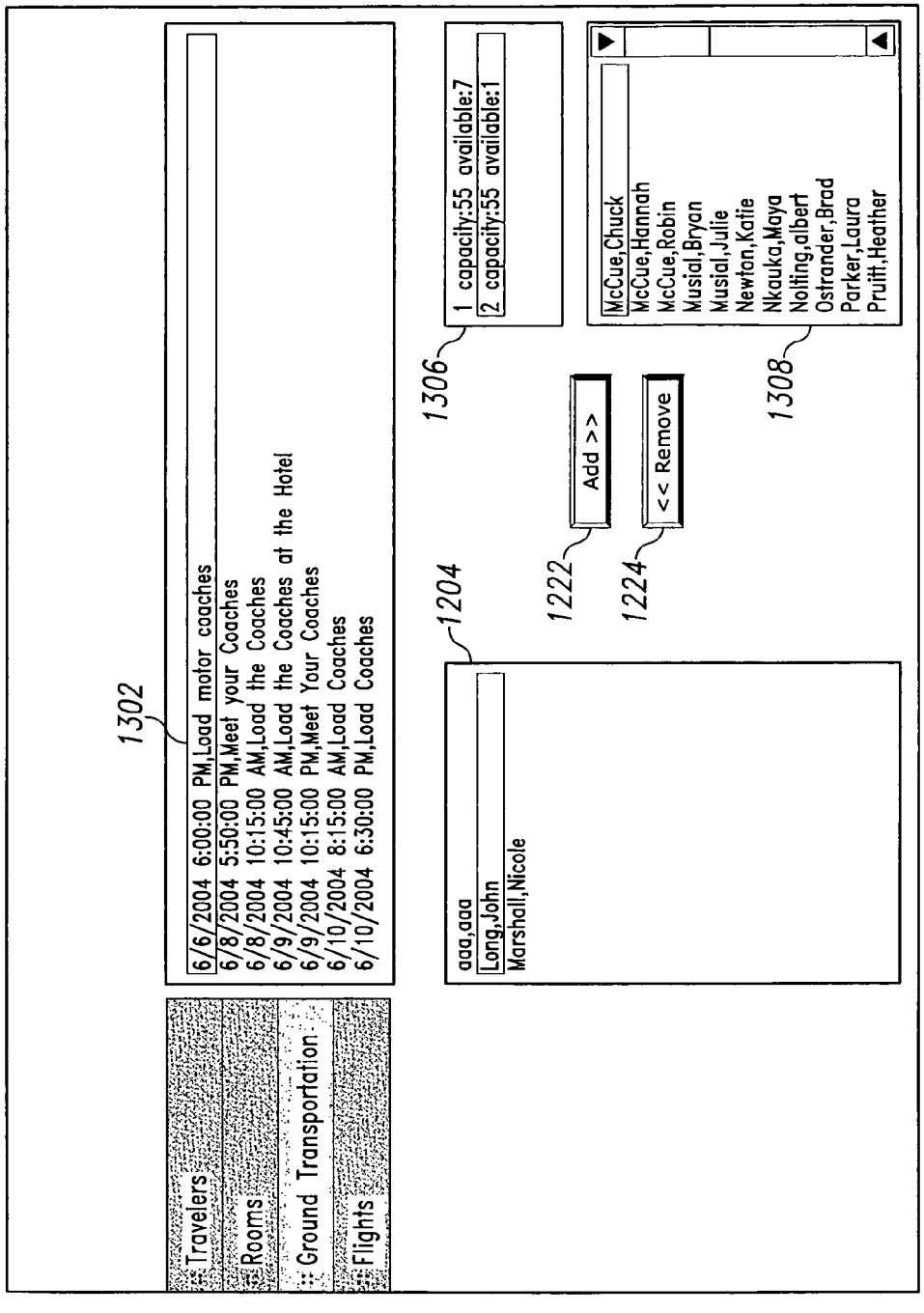
FIG. 13 is a ground transportation screen generated with the customized group tour development system illustrated in FIG. 1.

FIG. 13 is an example ground transportation selection screen 1300 that may be a pop-up screen initiated by activation of the ground transportation screen selection 1008 (FIG. 10). The ground transportation selection screen 1300 may include a ground transportation schedule 1302, the assignment list 1204 (FIG. 12), a ground transportation accommodations list 1306 and a ground transportation accommodations assigned list 1308. Similar to the lodging selection screen 1200 (FIG. 12), a client user may assign participants of the custom tour to ground transportation accommodations, such as seats in a bus, a train, a ferry, etc. within the ground transportation selection screen 1300.

The ground transportation schedule 1302 may include activities 548 (FIG. 5) of the custom tour from the database 118 (FIG. 1) that involves boarding ground transportation. Vendor ground transportation may be added to the customized tour framework using the create transport selection 576 (FIG. 5). The ground transportation accommodations list 1306 may provide a list of vehicles available from vendors for the custom tour, such as busses, train cars, etc. along with the capacity of each vehicle and the available accommodations.

The available accommodations may be updated to reflect the addition and removal of participants in the custom tour from assignment to a particular vehicle using the add and remove buttons 1222 and 1224. The ground transportation accommodations assigned list 1308 is a list of participants in the tour that are currently assigned to a selected vehicle from the ground transportation accommodations list 1306. In other examples, seat assignments in the vehicle, section assignments in the vehicle, etc. may also be assigned with the ground transportation selection screen 1300. Participants in the custom tour may be moved between the assignment list 1204 and the ground transportation accommodations assigned list 1308 by selecting a vehicle and adding or removing participants.

Figure 14:
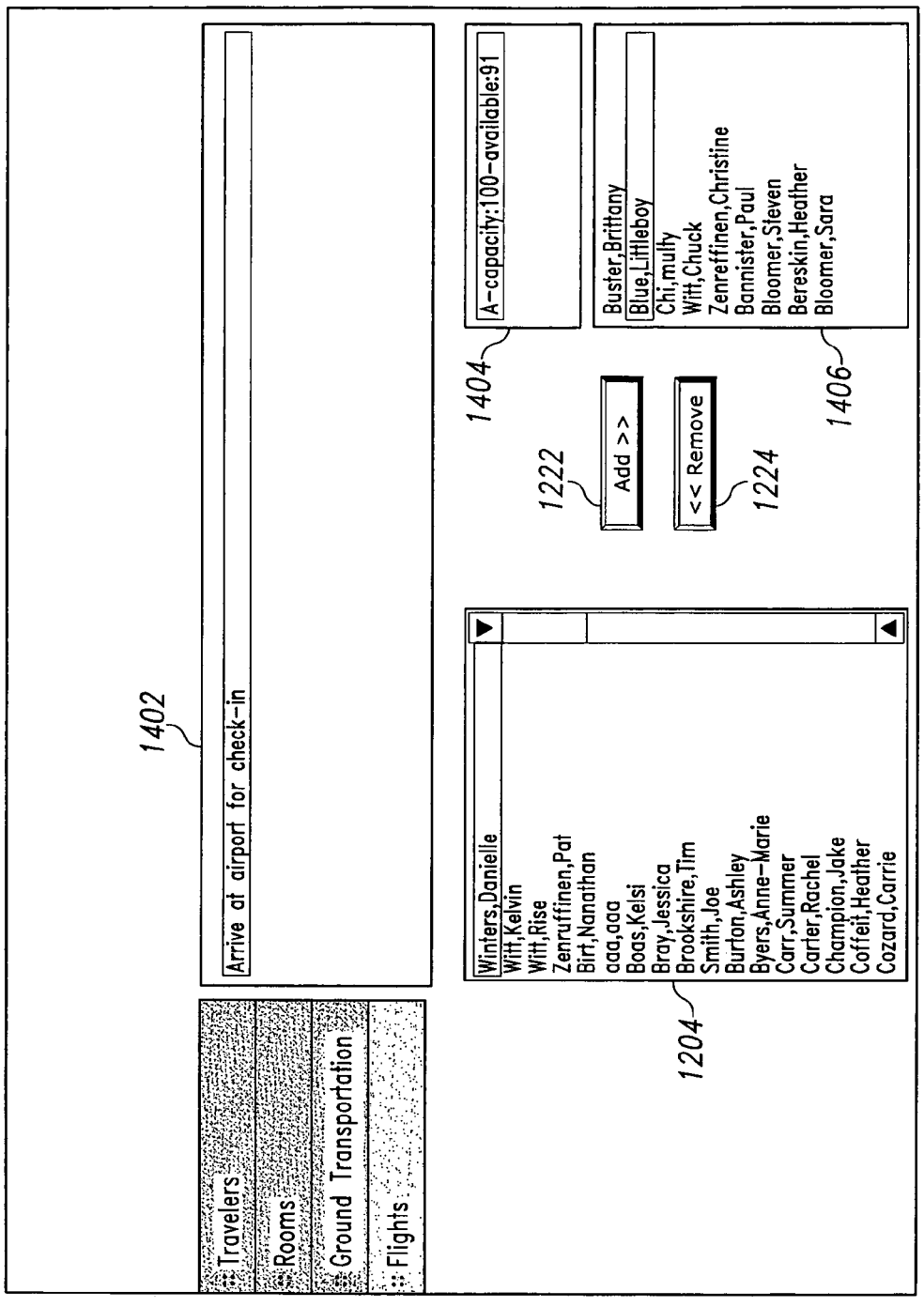
FIG. 14 is a flight screen generated with the customized group tour development system illustrated in FIG. 1.

FIG. 14 is an example flights selection screen 1400 that may be a pop-up screen initiated by activation of the flights screen selection 1010 (FIG. 10). The flights selection screen 1400 may include a flight schedule 1402 indicating the flights scheduled for the custom tour, the assignment list 1204 (FIG. 12), a flight accommodations list 1404 indicating the capacity of a selected flight and an accommodations assigned list 1406 to assign participants to the selected flight. Similar to the ground transportation selection screen 1300, a client user may assign participants of the custom tour to flight accommodations, such as seats on an airplane within the flight selection screen 1400 using the add and remove buttons 1222 and 1224. Vendor flights may be added to the customized tour framework using the create transport selection 576 (FIG. 5). In addition, participants in the tour may be associated with individual seats on the flight, groups, etc.

Figure 15:
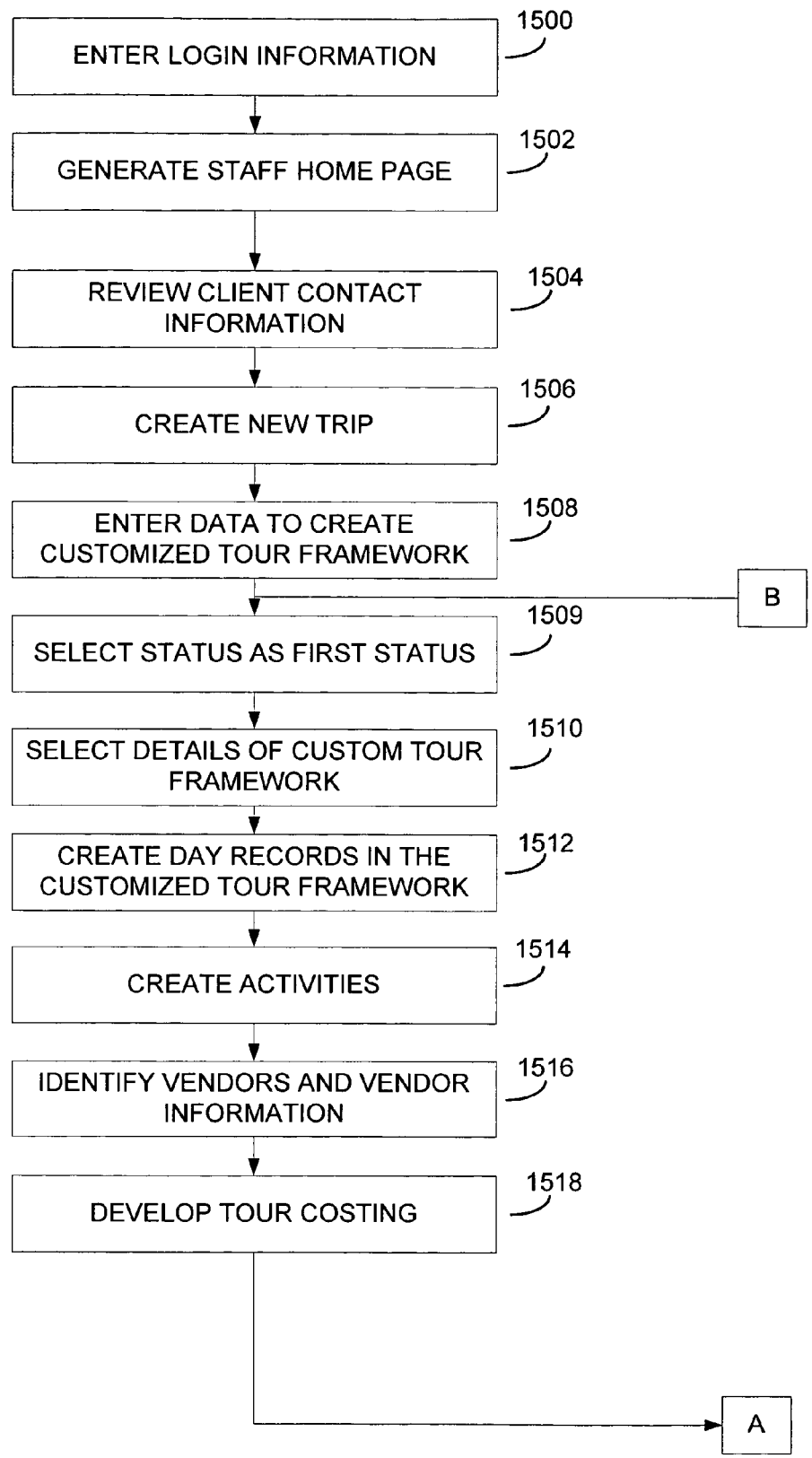
FIG. 15 is a process flow diagram illustrating operation of the customized group tour development system illustrated in FIG. 1.

FIG. 15 is a flow diagram illustrating operation of one example of the customized group tour development system 100 that will be described with reference to FIGS. 1-14. In this example, the client for the customized tour is a music group such as a high school marching band. At block 1500, a member of the sales staff who wishes to discuss a possible trip for a marching band with a band director accesses the staff member address of the customized group tour development system 100 and enters login information. At block 1502, the security module 224 authenticates the user as a sales staff user and the network server 206 generates the staff home page 300 with those capabilities enabled by the access level of the sales staff user. The sales staff user selects a contact from the clients subscreen 302 to review the contact information of the band director using the sales module 226 at block 1504.

At block 1506, the sales staff user concludes the meeting with the band director and activates the new trip function 328 to create a custom tour framework using the sales module 226 based on the meeting. The sales staff member enters custom tour information into the add/edit trip screen illustrated in FIG. 4 at block 1508. The status 406 of the custom tour is selected as a first status of "pending" at block 1509, and a new customized tour framework is created by the customized group tour development system 100. At block 1510, the sales staff user selects the details function 336 from the trips subscreen 304.

The sales staff user creates day records 526 for the customized tour framework with the create day function 514 at block 1512. At block 1514, the sales staff user creates activities 548 within each of the day records 526, such as travel, lodging, visiting attractions, attending marching band competition, etc. In addition, photographs, descriptions of the activities and locations, etc. may be added by the sales staff user using the previously described text functionality 554 and the picture functionality 556 (FIG. 5). The sales staff user may also use the supplier module 232 to preliminarily select vendors and vendor information such as prices, accommodations, etc. to support the activities within each of the day records 526 in the customized tour framework at block 1516. At block 1518, the customized group tour development system 100 uses the information in the customized tours framework to develop the tour costing sheet 600.

Figure 16:
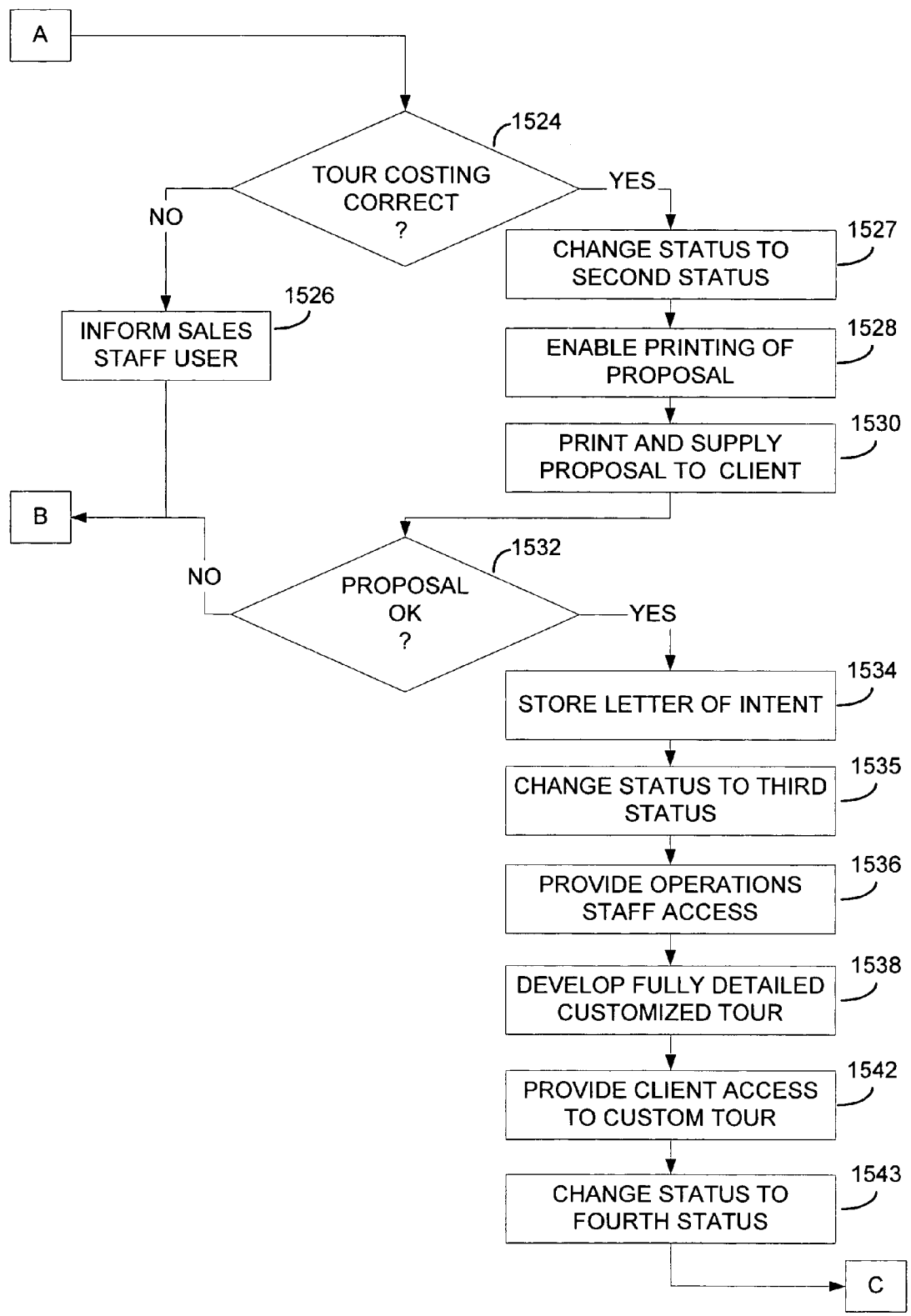
FIG. 16 is a second part of the process flow diagram illustrated in FIG. 15.

A finances staff user logs on to the customized group tour development system 100, is authenticated and reviews the tour costing sheet 600 using the financial module 230 at block 1524 in FIG. 16. If the tour costing sheet 600 is incorrect, the sales staff user is made aware of the issues at block 1526 and the operation returns to block 1510 to allow for correction of the customized tour framework. If the tour costing sheet 600 is accurate, the finances staff user changes the status 406 (FIG. 4) to a second status of "approved" using the finance module 230 (FIG. 2) at block 1527. Based on the change of status description to approved, the proposal selection 720 is enabled within the printing screen 700 at block 1528.

At block 1530, the sales staff user may print and present the proposal to the band director. The band director reviews the document to determine if the proposal is acceptable at block 1532. If the proposal is not acceptable, the operation returns to block 1510 so that the sales staff user can change the status 406 (FIG. 4) to the first status of "proposed" and appropriately modify the customized tour framework. If the proposal is acceptable to the band director, a letter of intent from the band director may stored in the database 118 and accessed with the letter of intent selection 722 at block 1534. The status 406 of the custom tour may be changed to a third status of "sold" at block 1535. At block 1536, based on the status change to sold, the operations staff is provided access to the custom tour framework. The operation staff logs in, is authenticated by the security module 224 and begins developing the customized tour framework to create the fully detailed customized tour using the operations module 228 at block 1538.

Figure 17:
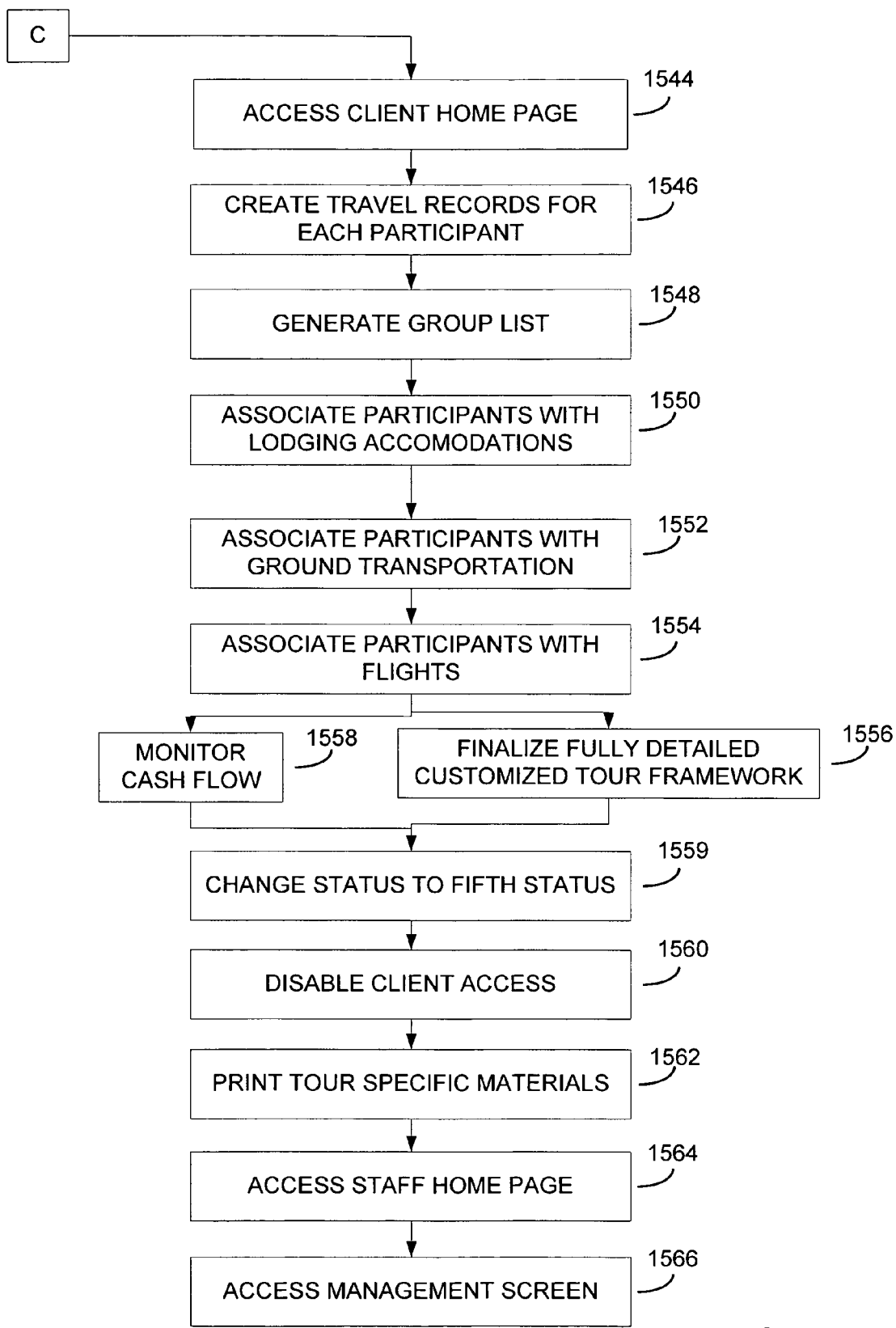
FIG. 17 is a third part of the process flow diagram illustrated in FIG. 15.

At block 1542, when the custom tour is sufficiently developed by the operations staff to include the details for the lodging, ground transportation and flights, the status 406 is changed to a fourth status of "in process." The band director is then provided the client address and a custom tour specific password to enable access as a client user to the customized tour framework at block 1543. Following authentication by the security module 224, the client user accesses the client home page 1000 of the customized group tour development system 100 using the client module 234 at block 1544 in FIG. 17. At block 1546, the client user selects the new traveler function 1014 and enters information in the new traveler screen 1100 to form a traveler record 1020 for each participant in the custom tour.

A group list 1004 is generated by the client module 234 at block 1548. The client user accesses the lodging screen 1200 to individually associate each of the participants with accommodations (a room) in one or more lodgings that are part of the custom tour at block 1550. At block 1552, the client user enters the ground transportation screen 1300 and associates each participant in the custom tour that is included in the group list 1004 with a vehicle, such as a bus. The client user enters the flight screen 1400 and associates each participant with an accommodation (a seat) on a flight at block 1554.

At block 1556, the operations staff finalizes the fully detailed customized tour that includes the participants and their associated accommodations using the operations module 228. In addition, at block 1558, the finance staff monitors client payments and payments to vendors to maintain positive cash flow using the finance module 230. The status 406 (FIG. 4) of the custom tour may be changed to a fifth status of "closed" at block 1559. Based on the change of the status 406 to closed, access by the band director to make further changes to the group list, etc. may be disabled by the security module 224 at block 1560. In addition, at block 1562, the operations staff may be enabled to access the printing screen 700 and print the tour specific materials for the fully detailed customized tour such as the trip booklets for the participants and the escort guide for the escort. Management staff may be authenticated by the security module 224 and access the staff home page 300 at block 1564. At block 1566, the management staff may access the management screen via the management selection 356 using the management module 236 and generate reports, adjust security clearance, add and/or delete users, adjust access levels of users, etc.

The previously discussed customized group tour development system 100 provides a uniform and systematic approach to creating a custom tour for a group of tour participants. By first creating a customized tour framework that is then developed into a fully detailed customized tour, continuity and consistency from the proposal stage to completion of custom tour is maintained. In addition, quality control may be applied during the proposal stage and throughout the development of the fully detailed custom tour to minimize errors and negative cashflow events. The customized group tour development system may also minimize errors in the information related to the participants in the tour by allowing the client access to the customized tour framework to enter the participant information. In addition, the capability of the client to associate the participants with accommodations minimizes errors and inefficiencies that may otherwise occur.

It is therefore intended that the foregoing detailed description be regarded as illustrative rather than limiting, and that it be understood that it is the following claims, including all equivalents, that are intended to define the spirit and scope of this invention.

The invention claimed is:

1. A method of developing a custom group tour, the method comprising:
   a server computer generating a first login request in response to access to a first network address;
   the server computer verifying an identity of a first user as a staff user;
   the server computer generating a staff page, the staff page generated in response to the identity of the user being verified as the staff user;
   the server computer creating a trip record for a proposed trip only if the identify of the first user is verified as the staff user, the trip record associated with a client record and created based on receipt of information in an add/edit trip screen;
   the server computer populating a tour costing sheet based on receipt of financial information in the trip record, the tour costing sheet including a sales total and an earnings total;
   the server computer printing a tour proposal in response to a print command received from the staff user;
   the server computer adding additional detailed information to the trip record to form a day-by-day, hour-by-hour itinerary only if the additional detailed information is received from the staff user, the additional detailed information comprising an actual number of participants, an accommodation, a transportation, pricing, a schedule, and tour events;
   the server computer continuously updating the tour costing sheet in accordance with the added additional detailed information;
   the server computer generating a second login request in response to access to a second network address;
   the server computer verifying an identity of a second user as a client user;

the server computer generating a client page specific to the trip record in accordance with the client record, the client page generated in response to the identity of the second user being verified as the client user;

the server computer receiving and updating the trip record with traveler specific information, room assignment information, transportation seat assignment information, and a plurality of chaperone assignments via the client page; and the server computer directing one of a single invoice for the client user to print, or a plurality of participant invoices for each respective one of a plurality of tour participants of the custom group tour to print, in response to receiving a print command from the staff user and a selection of one of a plurality of payment plans via the staff page, the payment plans including a participant payment plan and a group payment plan.

2. The method of claim 1, further comprising the server computer enabling the staff user to print a trip booklet for each participant in the custom group tour and an escort guide book based on the trip record and on verification of the identity of the staff user.

3. The method of claim 1, wherein the trip record comprises an assigned trip number, a status of the trip record, a plurality of trip option selling price entries, an entry for a number of the tour participants on the proposed trip, a selection of an identity of the staff user, an identity of a client contact from a list of client contacts, a selector for either group payment or individual payment and an indication of a percentage commission for the staff user.

4. The method of claim 1, further comprising the server computer assigning each of the tour participants to a respective one of a plurality of vehicles, wherein each of the vehicles is to travel from a first location to a second location.

5. The method of claim 1, further comprising including at least 80 participants in the custom group tour and the server computer assigning each one of the at least 80 participants to a corresponding one of a plurality of vehicles, each one of the vehicles to travel a single common destination.

6. The method of claim 3, wherein the server computer updating the tour costing sheet comprises the server computer calculating a sales and earnings estimate and a cash flow projection for the proposed trip based on at least one of the trip option selling price entries, a selection of either the group payment or the individual payment, and the percentage commission for the staff user.

7. The method of claim 1, further comprising the server computer storing a letter of intent received from a client contact, wherein the letter of intent indicates a financial commitment by the client contact to purchase the proposed trip.

8. The method of claim 1, wherein the trip record comprises a status of the trip record, and wherein the server computer adding the additional detailed information to the trip record includes denying entry of the additional detailed information into the trip record by the staff user until the status of the trip record is set to a predetermined status.

9. The method of claim 1, further comprising the server computer populating a cash flow projection section of the staff page with vendor invoice data related to payment of each of a plurality of vendors.

10. A method of developing a custom group tour, the method comprising:

a server computer generating a first login request in response to access to a first network address;

the server computer verifying an identity of a first user as a staff user;

the server computer generating a staff page, the staff page generated in response to the identity of the user being verified as the staff user;

the server computer creating a trip record for a proposed trip only if the identify of the first user is verified as the staff user, the trip record associated with a client record and created based on receipt of information in an add/edit trip screen;

the server computer populating a tour costing sheet for display based on receipt of financial information in the trip record, the tour costing sheet including a sales total and an earnings total;

the server computer printing a tour proposal in response to a print command received from the staff user;

the server computer adding additional detailed information to the trip record to form a day-by-day, hour-by-hour itinerary only if the additional detailed information is received from the staff user, the additional detailed information comprising an actual number of participants, an accommodation, a transportation, pricing, a schedule, and tour events;

the server computer continuously updating the tour costing sheet in accordance with the added additional detailed information after receiving, at the server computer, an agreement to purchase the custom group tour;

the server computer generating a second login request in response to access to a second network address;

the server computer verifying an identity of a second user as a client user;

the server computer generating a client page specific to the trip record in accordance with the client record, the client page generated in response to the identity of the second user being verified as the client user;

the server computer receiving and updating the trip record with traveler specific information, room assignment information, and transportation seat assignment information, via the client page; and the server computer, in response to receiving a print command from the staff user, directing a plurality of participant invoices for each respective one of a plurality of tour participants of the custom group tour to print.

* * * * *